(12) United States Patent
Singh

(10) Patent No.: US 11,553,053 B2
(45) Date of Patent: Jan. 10, 2023

(54) TRACKING APPLICATION USAGE FOR MICROAPP RECOMMENDATION

(71) Applicant: Citrix Systems, Inc., Fort Lauderdale, FL (US)

(72) Inventor: Manbinder Pal Singh, Coral Springs, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

(21) Appl. No.: 16/850,697

(22) Filed: Apr. 16, 2020

(65) Prior Publication Data

US 2021/0329081 A1    Oct. 21, 2021

(51) Int. Cl.
| | |
|---|---|
| *H04L 67/50* | (2022.01) |
| *H04L 67/01* | (2022.01) |
| *H04L 67/1396* | (2022.01) |
| *G06F 16/958* | (2019.01) |
| *G06F 11/34* | (2006.01) |
| *G06F 8/38* | (2018.01) |

(52) U.S. Cl.
CPC .............. *H04L 67/535* (2022.05); *G06F 8/38* (2013.01); *G06F 11/3438* (2013.01); *G06F 11/3442* (2013.01); *G06F 11/3452* (2013.01); *G06F 16/958* (2019.01); *H04L 67/01* (2022.05); *H04L 67/1396* (2022.05); *G06F 2201/86* (2013.01)

(58) Field of Classification Search
None
See application file for complete search history.

(56) References Cited

U.S. PATENT DOCUMENTS

| | | | |
|---|---|---|---|
| 8,312,450 B2 | 11/2012 | Gangadharappa et al. | |
| 9,110,685 B2 | 8/2015 | Suryanarayana et al. | |
| 9,280,252 B1 * | 3/2016 | Brandmaier | G06F 3/0482 |

(Continued)

FOREIGN PATENT DOCUMENTS

| | | |
|---|---|---|
| CN | 102054004 A | 5/2011 |
| CN | 106101250 A | 11/2016 |

(Continued)

OTHER PUBLICATIONS

"About the MDX Toolkit", retrieved from https://docs.citrix.com/en-us/mdx-toolkit/about-mdx-toolkit.html (Oct. 29, 2019).

(Continued)

*Primary Examiner* — Lance Leonard Barry
(74) *Attorney, Agent, or Firm* — Finch & Maloney PLLC

(57) ABSTRACT

Disclosed is a system for tracking user interactions with an application to recommend creation of a microapp. The system determines a recommendation score for creating a microapp corresponding to a functionality of an application based on at least one of the amount of time users spend interacting with the application, the number of interface elements of the application that the user changes, and the input values provided by the users. The system uses interactions corresponding to multiple different users to determine the recommendation score. The system may also recommend an interface element to be included in the microapp. The recommendation score is provided to an administrator, who may use the information to create a microapp.

20 Claims, 14 Drawing Sheets

(56) References Cited

U.S. PATENT DOCUMENTS

| | | | |
|---|---|---|---|
| 9,405,665 | B1 | 8/2016 | Shashi et al. |
| 9,471,624 | B1 | 10/2016 | Patil et al. |
| 10,621,062 | B2 | 4/2020 | Ligman et al. |
| 10,817,270 | B2* | 10/2020 | Straub .................. G06F 16/212 |
| 10,848,500 | B2 | 11/2020 | Bhattacharya et al. |
| 2006/0117059 | A1 | 6/2006 | Freeman et al. |
| 2012/0278736 | A1 | 11/2012 | Tran et al. |
| 2013/0227386 | A1* | 8/2013 | Ferlin ................ G06F 11/3636 715/221 |
| 2013/0251126 | A1 | 9/2013 | Hollander et al. |
| 2013/0326499 | A1 | 12/2013 | Mowatt et al. |
| 2014/0020068 | A1 | 1/2014 | Desai et al. |
| 2014/0351052 | A1* | 11/2014 | Khalsa ............... G06Q 30/0269 705/14.58 |
| 2015/0026660 | A1 | 1/2015 | Vaidyanathan et al. |
| 2015/0356495 | A1 | 12/2015 | Virdi et al. |
| 2016/0234624 | A1 | 8/2016 | Riva et al. |
| 2017/0212650 | A1 | 7/2017 | Sinyagin et al. |
| 2017/0277396 | A1* | 9/2017 | Chung .................. G06F 3/0482 |
| 2018/0075513 | A1 | 3/2018 | Bastide et al. |
| 2018/0081986 | A1 | 3/2018 | Sitik et al. |
| 2018/0189660 | A1 | 7/2018 | Malmi et al. |
| 2019/0065177 | A1 | 2/2019 | Khoongumjorn et al. |
| 2019/0179884 | A1* | 6/2019 | Wooldridge ............ G06F 3/011 |
| 2019/0324890 | A1* | 10/2019 | Li ........................ G06F 11/3664 |
| 2020/0026502 | A1 | 1/2020 | Moore et al. |
| 2022/0269742 | A1* | 8/2022 | Liu ....................... H04L 67/025 |

FOREIGN PATENT DOCUMENTS

| | | | | |
|---|---|---|---|---|
| CN | 106201624 | A | 12/2016 | |
| CN | 107820701 | A | 3/2018 | |
| CN | 108268260 | A | 7/2018 | |
| CN | 109117164 | A * | 1/2019 | ............... G06F 8/65 |
| CN | 110007986 | A | 7/2019 | |
| CN | 110069463 | A | 7/2019 | |
| CN | 110806975 | A | 2/2020 | |
| WO | WO-2013156066 | A1 * | 10/2013 | ......... G06F 17/3089 |

OTHER PUBLICATIONS

"Citrix Insight Services", retrieved from https://docs.citrix.com/en-us/citrix-virtual-apps-desktops/manage-deployment/cis.html (Dec. 18, 2019).

"Citrix Workspace Intelligence—Customer FAQ", retrieved from https://www.citrix.com/content/dam/citrix/en_us/documents/reference-material/citrix-workspace-intelligence-customer-faq.pdf (Oct. 2019).

"Microapps", retrieved from https://docs.citrix.com/en-us/citrix-microapps.html (Jan. 9, 2020).

International Search Report dated Dec. 25, 2020 for International Application No. PCT/CN2020/081406, 4 pages.

International Search Report dated Dec. 29, 2020 for International Application No. PCT/CN2020/084144, 4 pages.

Ruiz, "Citrix Workspace Microapps Service", retrieved from https://docs.citrix.com/en-us/tech-zone/learn/tech-briefs/workspace-microapps.html (Feb. 4, 2020).

USA U.S. Appl. No. 15/931,747, filed May 14, 2020.

Wiffen, "Building a simple Citrix microapp that shows blog posts from a WordPress RSS feed", The Curious Kabri (Blog), retrieved from https://kabri.uk/2019/12/18/building-a-simple-citrix-microapp-that-shows-blog-posts-from-a-wordpress-rss-feed/ (posted Dec. 18, 2019).

Written Opinion of the International Searching Authority dated Dec. 25, 2020 for International Application No. PCT/CN2020/081406, 4 pages.

Written Opinion of the International Searching Authority dated Dec. 29, 2020 for International Application No. PCT/CN2020/084144, 4 pages.

Xu, "An Algorithm for Comparing Similarity Between Two Trees", thesis submitted in partial fulfillment of the requirements for the degree of Master of Science in the Department of Computer Science in the Graduate School of Duke University, retrieved from https://arxiv.org/pdf/1508.03381.pdf (submitted Aug. 13, 2015).

Zhu Han; et al., "Learning Tree-based Deep Model for Recommender Systems", Applied Data Science Track Paper, KDD 2018, The 24th ACM SIGKDD International Conference on Knowledge Discovery Data Mining, Aug. 19-23, 2018, 10 pages.

USA U.S. Appl. No. 16/862,781, filed Apr. 30, 2020.

Notice of Allowance in related U.S. Appl. No. 16/862,781 (dated May 13, 2021) 9 pages.

International Search Report and Written Opinion dated Jun. 24, 2021 for International Application No. PCT/US2021/026946, 12 pages.

Notice of Allowance for U.S. Appl. No. 15/931,747 (dated Nov. 2, 2021) (9 pages).

Miazurowski, "Estimating confidence of individual rating predictions in collaborative filtering recommender systems", Expert Systems with Applications 40, pp. 3847-3857 (2013).

Mazurowski, "Estimating confidence of individual rating predictions in collaborative filtering recommender systems", Expert Systems with Applications 40, pp. 3847-3857 (2013).

Lu Xuan; et al., "PRADO: Predicting app Adoption by Learning the Correlation between Developer-Controllable Properties and User Behaviors", Proceedings of the ACM on Interactive, Mobile, Wearable and Ubiquitous Technologies, Sep. 2017, vol. 1, No. 3, 30 pages.

Lin et al., "An Exploratory Service Composition Approach for Mobile Application", Ruan Jian Xue Bao/Journal of Software, 26(9):2191-2211 (2015) (in Chinese; English translation of abstract only).

* cited by examiner

Microapp Management Dashboard      Logged in as: <Admin Username>

| | Application Name | Form name | Recommendation Score | Number of users | Total time | Avg. time | Recommended Fields |
|---|---|---|---|---|---|---|---|
| 1 | Human Resource | PTO Request | 80 | 200 | 925 | 4.5 | Request Date<br>Manager Name |
| 2 | Accounting | Expense Reimbursement Request | 75 | 140 | 1500 | 10 | Amount<br>Department<br>File Attachment |
| 3 | IT | Create Issue Ticket | 60 | 100 | 1500 | 14 | Summary<br>Defect Source<br>Affects Versions<br>Description |

Page 1 2 3 ...

FIG. 9

TRACKING APPLICATION USAGE FOR MICROAPP RECOMMENDATION

BACKGROUND

Various systems have been developed that allow client devices to access applications and/or data files over a network. Certain products offered by Citrix Systems, Inc., of Fort Lauderdale, Fla., including the Citrix Workspace™ family of products, provide such capabilities. One feature of the Citrix Workspace™ is a microapp that provides streamlined functionality of an application, enabling a user to perform certain tasks without launching the full application.

SUMMARY

This Summary is provided to introduce a selection of concepts in a simplified form that are further described below in the Detailed Description. This Summary is not intended to identify key features or essential features, nor is it intended to limit the scope of the claims included herewith.

In some of the disclosed embodiments, a method comprises evaluating, by a client device, data received from a website to identify a first form, and identifying, by the client device, at least first and second input elements on the first form, where the first input element corresponds to a first field that can be varied by a user of the client device and the second input element corresponds to an instruction to submit the first form to the website. The client device enables at least first and second event handlers corresponding to the first and second input elements, respectively, where the first event handler is configured to detect whether the first field changes and the second event handler is configured to detect selection of the second input element. The second event handler detects selection of the second input element and in response to detecting selection of the second input element, the client device determines, based on at least one change detected by the first event handler, that the first field was changed by the user. The client device further stores first data indicating that the first field in a submitted version of the first form was changed by the user.

In some embodiments, a method comprises receiving first data representing a first interaction by a first user with a first form of an application, identifying a first hash value representation of a first input value entered by the first user for a first input element of the first form, receiving second data representing a second interaction by a second user with the first form, and identifying a second hash value representation of a second input value entered by the second user for the first input element. The method further comprises determining variance data using differences in at least the first hash value representation and the second hash value representation, determining, using at least the variance data, a first recommendation for creating a streamlined functionality corresponding to a functionality of the first form, and sending, to a computing device, the first recommendation, a first indication of the first form, and a second indication of the first input element.

In some disclosed embodiments, a system comprises a first computing device including at least a first processor, and at least a first computer-readable medium encoded with first instructions which, when executed by the at least first processor, cause the first computing device to detect interaction with a first form, identify at least first and second input elements on the first form, where the first input element corresponds to a first field that can be varied by a user of the first computing device and the second input element corresponds to an instruction to submit the first form, and enable at least first and second event handlers corresponding to the first and second input elements, respectively, where the first event handler is configured to detect whether the first field changes and the second event handler is configured to detect selection of the second input element. The first instructions further cause the first computing device to detect, by the second event handler, selection of the second input element, in response to detecting selection of the second input element, determine, based on at least one change detected by the first event handler, that the first field was changed by the user, and store first data indicating at least that the first field in a submitted version of the first form was changed by the user. The system further comprises a computing system including at least a second processor and at least a second computer-readable medium encoded with second instructions which, when executed by the at least second processor, cause the computing system to receive the first data representing a first interaction by the user with the first form, identify a first hash value representation of a first input value entered by the user for the first field, receive second data representing a second interaction by an additional user with the first form, and identify a second hash value representation of a second input value entered by the additional user for the first field. The second instructions further cause the computing system to determine variance data using differences in at least the first hash value representation and the second hash value representation, and determine, using at least the variance data, a recommendation for creating a streamlined functionality corresponding to a functionality of the first form.

BRIEF DESCRIPTION OF THE DRAWINGS

Objects, aspects, features, and advantages of embodiments disclosed herein will become more fully apparent from the following detailed description, the appended claims, and the accompanying figures in which like reference numerals identify similar or identical elements. Reference numerals that are introduced in the specification in association with a figure may be repeated in one or more subsequent figures without additional description in the specification in order to provide context for other features, and not every element may be labeled in every figure. The drawings are not necessarily to scale, emphasis instead being placed upon illustrating embodiments, principles and concepts. The drawings are not intended to limit the scope of the claims included herewith.

FIG. 1B shows an example of a display screen showing a form of an application that a user may interact with;

FIG. 9 shows an example of a display screen showing a dashboard displaying information related to microapp recommendations as determined by the system shown in FIG. 5.

DETAILED DESCRIPTION

For purposes of reading the description of the various embodiments below, the following descriptions of the sections of the specification and their respective contents may be helpful:

Section A provides an introduction to example embodiments of systems for tracking usage of a form and for determine a recommendation score for creating a microapp;

Section B describes a network environment and computing environment which may be useful for practicing embodiments described herein;

Section C describes embodiments of systems and methods for delivering shared resources using a cloud computing environment;

Section D describes embodiments of systems and methods for managing and streamlining access by clients to a variety of resources;

Section E provides a detailed description of example embodiments of systems for tracking application usage for microapp recommendations; and Section F describes example implementations of methods, systems/devices, and computer-readable media in accordance with the present disclosure.

Figure 1A:
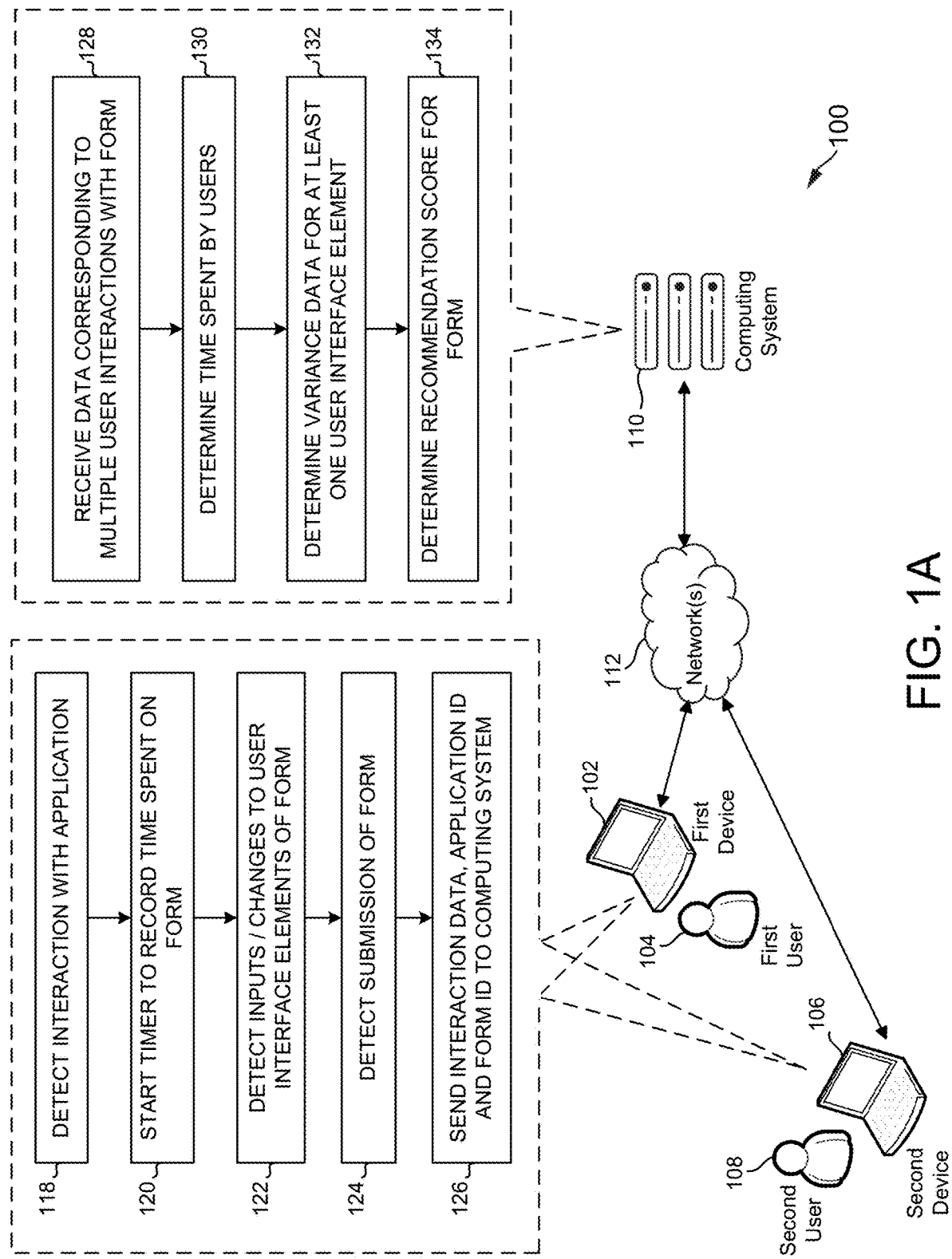
FIG. 1A is a diagram of how a system may track multiple interactions with a form of an application and may determine a recommendation score for creating a microapp in accordance with some embodiments.

A. Introduction to Illustrative Embodiments of a System for Tracking Usage of a Form and for Determining a Recommendation Score for Creating a Microapp FIG. 1A is a diagram showing an example of how a system 100 may track multiple interactions with a form of an application and may determine a recommendation score for creating a microapp in accordance with some embodiments. As shown, the system 100 may include a first device 102 operated by a first user 104, a second device 106 operated by a second user 108, and a computing system 110. The first device 102 and the second device 106 may be client devices 202 described in detail below. The computing system 110 may include one or more servers 204 described in detail below, and may include an analytics service component 438 described in detail below. The first device 102 and the second device 106 may be in communication with the computing system 110 via one or more networks 112. The network(s) 112 may correspond to one or more of the networks 206 described below in detail in connection with at least FIG. 2A.

The system 100 may track the first user's 104 interaction with a form of an application accessed via the first device 102. In doing so, the first device 102 may perform the steps shown on the left-hand side of FIG. 1A. A user may, for example, launch, navigate to, submit or otherwise interact with a form or an application by providing inputs using a mouse, a keyboard, a touchscreen, a fingerprint scanner or other input interfaces, or by providing inputs such as gestures (determined from image data captured by the device 102, 106), spoken commands (determined from audio data captured by the device 102, 106), or other forms of input. The first user 104 may, for example, access the form using an embedded web browser provided as part of the resource access application 424 that is described below in connection with FIGS. 4B and 4C. The embedded web browser may include various event handlers to track user interactions with the form. At a step 118, the first device 102 may detect interaction with an application by the first user 104 launching the application and navigating to a particular form (page, tab or a portion) within the application. At a step 120, the first device 102 may start a timer to record time spent on the form by the first user 104. The timer may be started in response to detecting (at the step 118) that the first user 104 is interacting with the form. At a step 122, the first device 102 may detect inputs and changes made to interface elements of the form by the first user 104. The first user 104 may enter values or provide other types of inputs via interface elements, such as, text fields, drop-down menus, radio buttons, check-boxes, file attachments, etc. When the first user 104 changes an interface element, the first device 102 may record the name (or other identifier) of the interface element, and may maintain a list of interface elements of the form that the first user 104 interacts with. When the first user 104 provides an input, the first device 102 may record a representation of the input value (e.g., a hash value). At a step 124, the first device 102 may detect submission of the form when the first user 104 selects a submission button. In response to detecting submission of the form, the first device 102 may stop the timer and store interaction data, including the amount of time identified by the timer, the list of interface elements the first user 104 interacted with and representations of input values provided by the first user 104. The interaction data may, for example, be associated with an application identifier corresponding to the application and a form identifier corresponding to the form. At a step 126, the first device 102 may send the interaction data, the application identifier, and the form identifier to the computing system 110.

The second user 108 may access the same form, via the second device 106, as the first user 104 did via the first device 102. The second device 106 may track the second user's 108 interaction with the form as described above in relation to the first device 102 tracking the first user's 104 interaction with the form. The second device 106 may store interaction data including the amount of time spent by the second user 108 interacting with the form, the interface elements changed by the second user 108 and representations of input values provided by the second user 108. The second device 106 may send the interaction data to the computing system 110. Further details on how the system may track user interactions with a form are described below in relation to FIGS. 6 and 7.

An example routine that may be performed by the computing system 110 is shown on the right-hand side of FIG. 1A. As shown, at a step 128, the computing system 110 may receive data corresponding to multiple user interactions with the form, such as interaction data sent by the first device 102 and the second device 106. In some embodiments, the form may be hosted by the computing system 110. In other embodiments, the form may be hosted by another server, computing system or computing device not shown in FIG. 1A. The computing system 110 may continue to receive interaction data for a given time period (e.g., a week, a month, etc.) before performing the next steps to determine a recommendation score for creating a microapp. Once a certain amount of data is received, at a step 130 the computing system 110 may determine, using the received data, the amount of time spent by multiple users interacting with the form. At step 132, the computing system 110 may determine, using the received data, variance data for at least one interface element via which multiple users provided input values. The variance data may, for example, indicate a level of variation in the input values provided by different users. The computing system 110 may use representations of the input values to determine the variance data. The computing system 110 may determine variance data for each interface element that received an input value. At step 134, the computing system 110 may determine a recommendation score for creating a microapp for the form. The recommendation score may be determined, for example, using the amount of time spent by users interacting with the form and the variance data for the interface element(s) of the form. Further details on how the computing system 110 may determine the recommendation score are described below in relation to FIG. 8.

Figure 1B:

FIG. 1B shows a display screen 150 presenting an example form of an application that a user may interact with. As shown, a form may include various interface elements that a user can interact with by providing/changing input values. Such interface elements may include a text field (associated with label/name 152), drop-down menus (associated with labels/names 154 and 156), and a text field 158. The form may also include a submission button or other similarly-named button (e.g., create button 160) that enables the user to submit the form. The system 100 shown in FIG. 1A may track the user's interactions with the form shown in FIG. 1B, and may determine a recommendation score for creating a microapp for such a form.

As described below in detail in relation to FIG. 4C, a microapp may provide one or more streamlined functionalities for an application that enable a user to complete/perform certain tasks without a full launch of the application. The system 100 may analyze multiple users' interactions with a form to determine if the form is a good candidate for a microapp based on factors such as the amount of time users spend interacting with the form, the number of interface elements users interact with, and the different types of input values provided by users.

In some cases, a microapp with fewer fields/interface elements may be better than a microapp with a large number of fields/interface elements, so a user can perform a task more efficiently using the microapp. In other words, interacting with a microapp that has a large number of fields/interface elements may be as complex and time consuming as interacting with the full application. Recognizing this, the system 100 may determine that a form with fewer changed interface elements has a higher recommendation score than a form with a large number of changed interface elements.

Additional details and example implementations of embodiments of the present disclosure are set forth below in Section E, following a description of example systems and network environments in which such embodiments may be deployed.

B. Network and Computing Environment

Figure 2A:
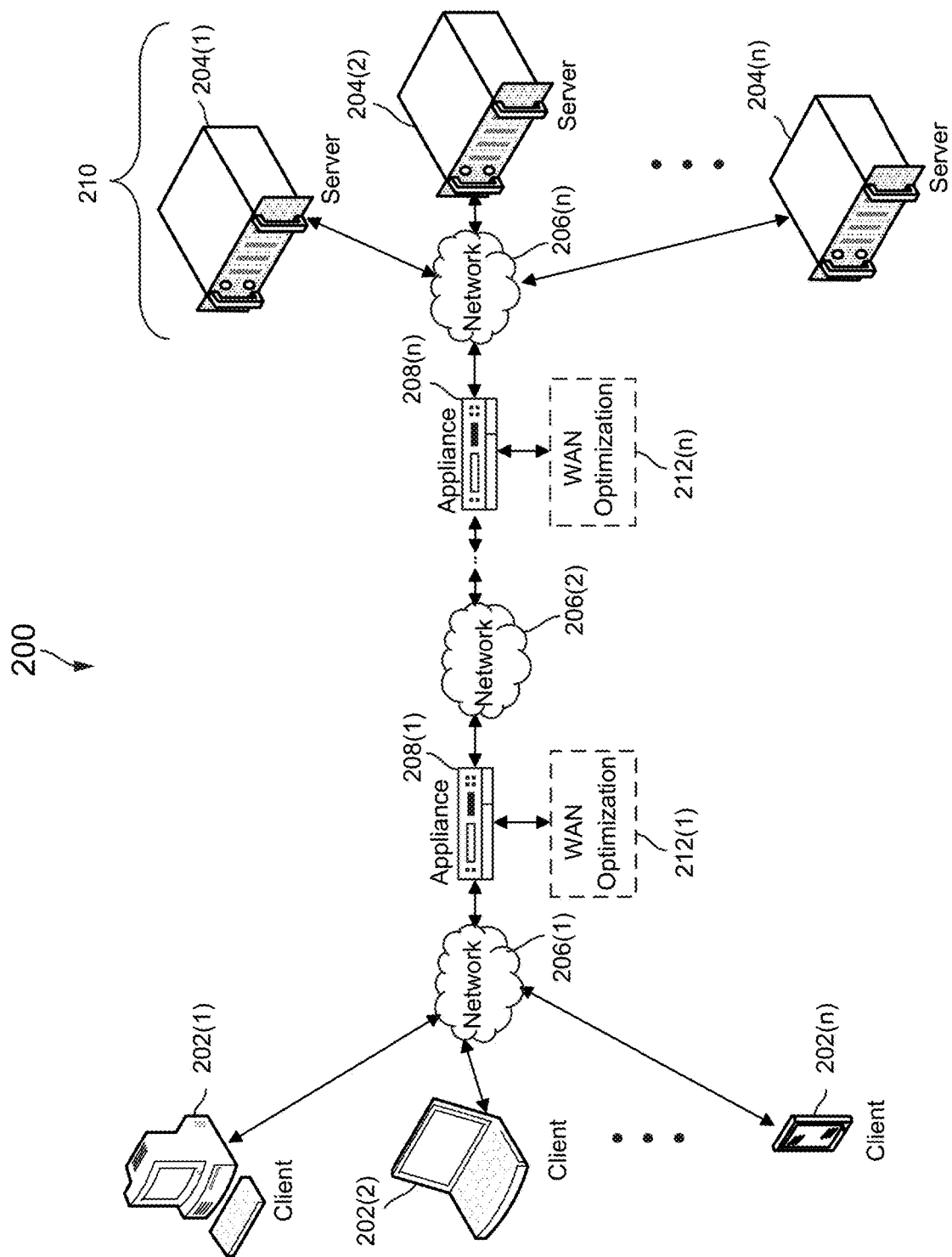
FIG. 2A is a diagram of a network computing environment in which some embodiments of the peripheral device sharing techniques disclosed herein may deployed.

Referring to FIG. 2A, an illustrative network environment 200 is depicted. As shown, the network environment 200 may include one or more clients 202(1)-202(n) (also generally referred to as local machine(s) 202 or client(s) 202) in communication with one or more servers 204(1)-204(n) (also generally referred to as remote machine(s) 204 or server(s) 204) via one or more networks 206(1)-206(n) (generally referred to as network(s) 206). In some embodiments, a client 202 may communicate with a server 204 via one or more appliances 208(1)-208(n) (generally referred to as appliance(s) 208 or gateway(s) 208). In some embodiments, a client 202 may have the capacity to function as both a client node seeking access to resources provided by a server 204 and as a server 204 providing access to hosted resources for other clients 202.

Although the embodiment shown in FIG. 2A shows one or more networks 206 between the clients 202 and the servers 204, in other embodiments, the clients 202 and the servers 204 may be on the same network 206. When multiple networks 206 are employed, the various networks 206 may be the same type of network or different types of networks. For example, in some embodiments, the networks 206(1) and 206(n) may each be a private network such as a local area network (LAN) or a company Intranet, while the network 206(2) may be a public network, such as a metropolitan area network (MAN), wide area network (WAN), or the Internet. In other embodiments, one or both of the network 206(1) and the network 206(n), as well as the network 206(2), may be public networks. In yet other embodiments, all three of the network 206(1), the network 206(2) and the network 206(n) may be private networks. The networks 206 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols. In some embodiments, the network(s) 206 may include one or more mobile telephone networks that use various protocols to communicate among mobile devices. In some embodiments, the network(s) 204 may include one or more wireless local-area networks (WLANs). For short range communications within a WLAN, clients 202 may communicate using 802.11, Bluetooth, and/or Near Field Communication (NFC).

As shown in FIG. 2A, one or more appliances 208 may be located at various points or in various communication paths of the network environment 200. For example, the appliance 208(1) may be deployed between the network 206(1) and the network 206(2), and the appliance 208(n) may be deployed between the network 206(2) and the network 206(n). In some embodiments, the appliances 208 may communicate with one another and work in conjunction to, for example, accelerate network traffic between the clients 202 and the servers 204. In some embodiments, each appliance 208 may act as a gateway between two or more networks. In other embodiments, one or more of the appliances 208 may instead be implemented in conjunction with or as part of a single one of the clients 202 or servers 204 to allow such device to connect directly to one of the networks 206. In some embodiments, one or more appliances 208 may operate as an application delivery controller (ADC) to provide one or more of the clients 202 with access to business applications and other data deployed in a datacenter, the cloud, or delivered as Software as a Service (SaaS) across a range of client devices, and/or provide other functionality such as load balancing, etc. In some embodiments, one or more of the appliances 208 may be implemented as network devices sold by Citrix Systems, Inc., of Fort Lauderdale, Fla., such as Citrix Gateway™ or Citrix ADC™.

A server 204 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 204 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 204 may execute a remote presentation services program or other program that uses a thin-client or a remote-display protocol to capture display output generated by an application executing on a server 204 and transmit the application display output to a client device 202.

In yet other embodiments, a server 204 may execute a virtual machine providing, to a user of a client 202, access to a computing environment. The client 202 may be a virtual machine. The virtual machine may be managed by, for example, a hypervisor, a virtual machine manager (VMM), or any other hardware virtualization technique within the server 204.

As shown in FIG. 2A, in some embodiments, groups of the servers 204 may operate as one or more server farms 210. The servers 204 of each such server farm 210 may be logically grouped, and may either be geographically co-located (e.g., on premises) or geographically dispersed (e.g., cloud based) from the clients 202 and/or other servers 204. In some embodiments, two or more server farms 210 may communicate with one another, e.g., via respective appliances 208 connected to the network 206(2), to allow multiple server-based processes to interact with one another.

As also shown in FIG. 2A, in some embodiments, one or more of the appliances 208 may include, be replaced by, or be in communication with, one or more additional appliances, such as WAN optimization appliances 212(1)-212(n), referred to generally as WAN optimization appliance(s) 212. For example, each WAN optimization appliance 212 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, one or more of the appliances 212 may be a performance enhancing proxy or a WAN optimization controller. In some embodiments, for example, one or more of the appliances 212 may be implemented as products sold by Citrix Systems, Inc., of Fort Lauderdale, Fla., such as Citrix SD-WAN™ or Citrix Cloud™.

Figure 2B:
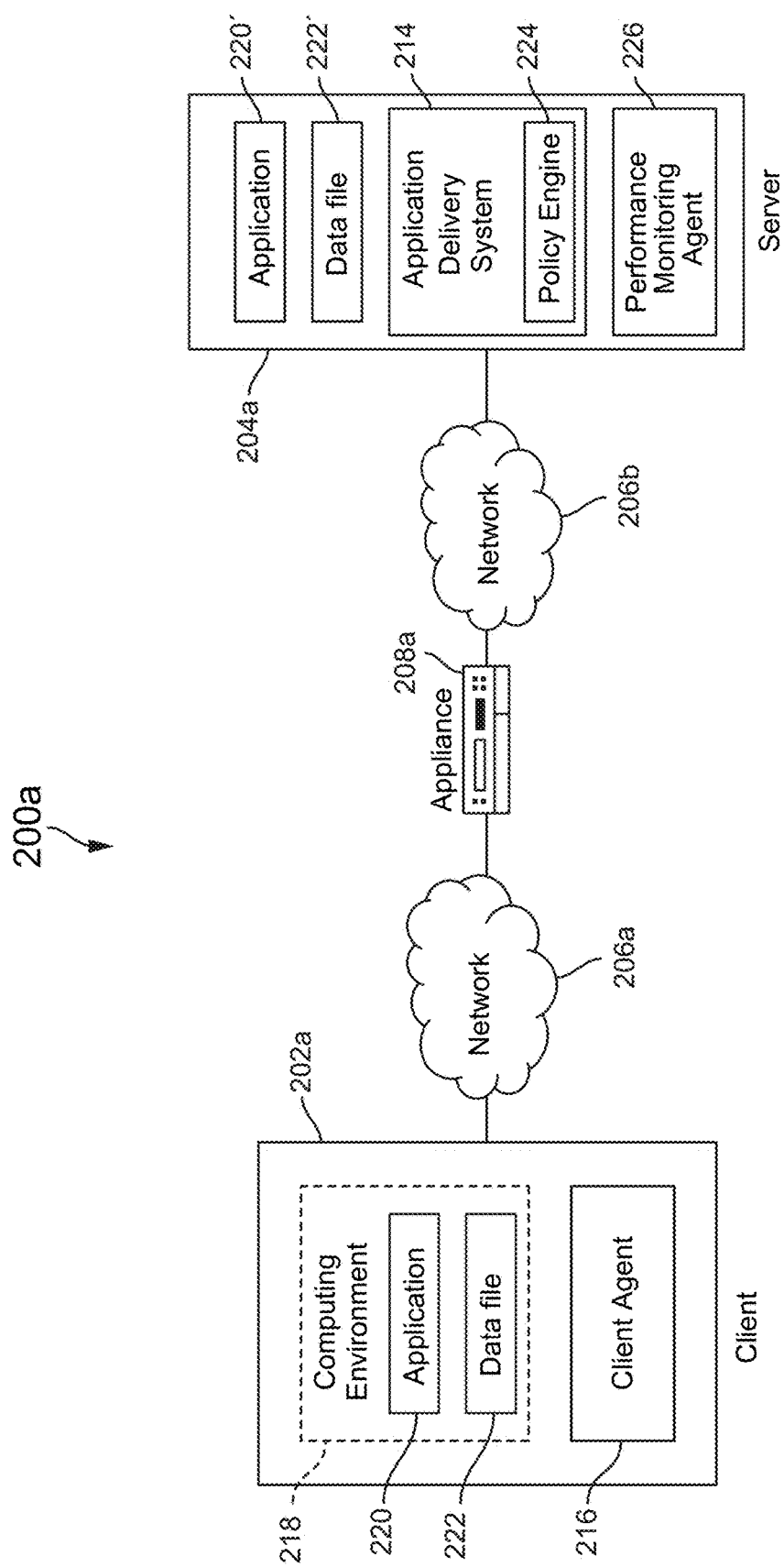
FIG. 2B is a block diagram of a computing system that may be used to implement one or more of the components of the computing environment shown in FIG. 2A in accordance with some embodiments.

FIG. 2B illustrates an example of a computing system 246 that may be used to implement one or more of the respective components (e.g., the clients 202, the servers 204, the appliances 208, 212) within the network environment 200 shown in FIG. 2A. As shown in FIG. 2B, the computing system 246 may include one or more processors 248, volatile memory 250 (e.g., RAM), non-volatile memory 252 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), a user interface (UI) 254, one or more communications interfaces 256, and a communication bus 258. The user interface 254 may include a graphical user interface (GUI) 260 (e.g., a touchscreen, a display, etc.) and one or more input/output (I/O) devices 262 (e.g., a mouse, a keyboard, etc.). The non-volatile memory 252 may store an operating system 264, one or more applications 266, and data 268 such that, for example, computer instructions of the operating system 264 and/or applications 266 are executed by the processor(s) 248 out of the volatile memory 250. Data may be entered using an input device of the GUI 260 or received from I/O device(s) 262. Various elements of the computing system 246 may communicate via communication the bus 258. The computing system 246 as shown in FIG. 2B is shown merely as an example, as the clients 202, servers 204 and/or appliances 208 and 212 may be implemented by any computing or processing environment and with any type of machine or set of machines that may have suitable hardware and/or software capable of operating as described herein.

The processor(s) 248 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

The communications interfaces 256 may include one or more interfaces to enable the computing system 246 to access a computer network such as a Local Area Network (LAN), a Wide Area Network (WAN), a Personal Area Network (PAN), or the Internet through a variety of wired and/or wireless connections, including cellular connections.

As noted above, in some embodiments, one or more computing systems 246 may execute an application on behalf of a user of a client computing device (e.g., a client 202), may execute a virtual machine, which provides an execution session within which applications execute on behalf of a user or a client computing device (e.g., a client 202), such as a hosted desktop session, may execute a terminal services session to provide a hosted desktop environment, or may provide access to a computing environment including one or more of: one or more applications, one or more desktop applications, and one or more desktop sessions in which one or more applications may execute.

Figure 3:
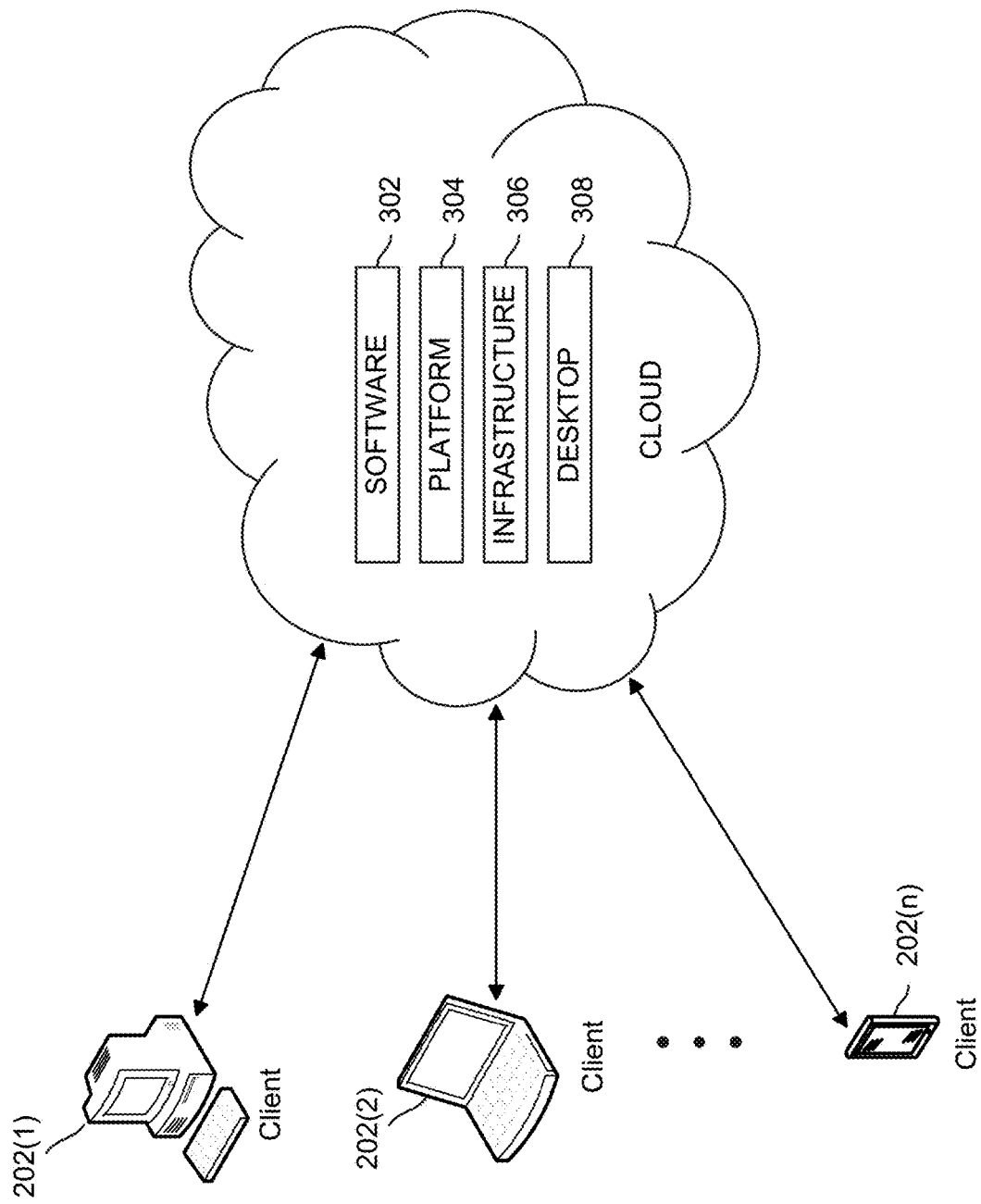
FIG. 3 is a schematic block diagram of a cloud computing environment in which various aspects of the disclosure may be implemented.

C. Systems and Methods for Delivering Shared Resources Using a Cloud Computing Environment Referring to FIG. 3, a cloud computing environment 300 is depicted, which may also be referred to as a cloud environment, cloud computing or cloud network. The cloud computing environment 300 can provide the delivery of shared computing services and/or resources to multiple users or tenants. For example, the shared resources and services can include, but are not limited to, networks, network bandwidth, servers, processing, memory, storage, applications, virtual machines, databases, software, hardware, analytics, and intelligence.

In the cloud computing environment 300, one or more clients 202 (such as those described above) are in communication with a cloud network 304. The cloud network 304 may include back-end platforms, e.g., servers, storage, server farms and/or data centers. The clients 202 may correspond to a single organization/tenant or multiple organizations/tenants. More particularly, in one example implementation, the cloud computing environment 300 may provide a private cloud serving a single organization (e.g., enterprise cloud). In another example, the cloud computing environment 300 may provide a community or public cloud serving multiple organizations/tenants.

In some embodiments, a gateway appliance(s) or service may be utilized to provide access to cloud computing resources and virtual sessions. By way of example, Citrix Gateway, provided by Citrix Systems, Inc., may be deployed on-premises or on public clouds to provide users with secure access and single sign-on to virtual, SaaS and web applications. Furthermore, to protect users from web threats, a gateway such as Citrix Secure Web Gateway may be used. Citrix Secure Web Gateway uses a cloud-based service and a local cache to check for URL reputation and category.

In still further embodiments, the cloud computing environment 300 may provide a hybrid cloud that is a combination of a public cloud and a private cloud. Public clouds may include public servers that are maintained by third parties to the clients 202 or the enterprise/tenant. The servers may be located off-site in remote geographical locations or otherwise.

The cloud computing environment 300 can provide resource pooling to serve multiple users via clients 202 through a multi-tenant environment or multi-tenant model with different physical and virtual resources dynamically assigned and reassigned responsive to different demands within the respective environment. The multi-tenant environment can include a system or architecture that can provide a single instance of software, an application or a software application to serve multiple users. In some embodiments, the cloud computing environment 300 can provide on-demand self-service to unilaterally provision computing capabilities (e.g., server time, network storage) across a network for multiple clients 202. By way of example, provisioning services may be provided through a system such as Citrix Provisioning Services (Citrix PVS). Citrix PVS is a software-streaming technology that delivers patches, updates, and other configuration information to multiple virtual desktop endpoints through a shared desktop image. The cloud computing environment 300 can provide an elasticity to dynamically scale out or scale in response to different demands from one or more clients 202. In some embodiments, the cloud computing environment 300 may include or provide monitoring services to monitor, control and/or generate reports corresponding to the provided shared services and resources.

In some embodiments, the cloud computing environment 300 may provide cloud-based delivery of different types of cloud computing services, such as Software as a service (SaaS) 302, Platform as a Service (PaaS) 304, Infrastructure as a Service (IaaS) 306, and Desktop as a Service (DaaS) 308, for example. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS include AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif.

PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif.

SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. Citrix ShareFile from Citrix Systems, DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Similar to SaaS, DaaS (which is also known as hosted desktop services) is a form of virtual desktop infrastructure (VDI) in which virtual desktop sessions are typically delivered as a cloud service along with the apps used on the virtual desktop. Citrix Cloud from Citrix Systems is one example of a DaaS delivery platform. DaaS delivery platforms may be hosted on a public cloud computing infrastructure such as AZURE CLOUD from Microsoft Corporation of Redmond, Wash., or AMAZON WEB SERVICES provided by Amazon.com, Inc., of Seattle, Wash., for example. In the case of Citrix Cloud, Citrix Workspace app may be used as a single-entry point for bringing apps, files and desktops together (whether on-premises or in the cloud) to deliver a unified experience.

Figure 4A:
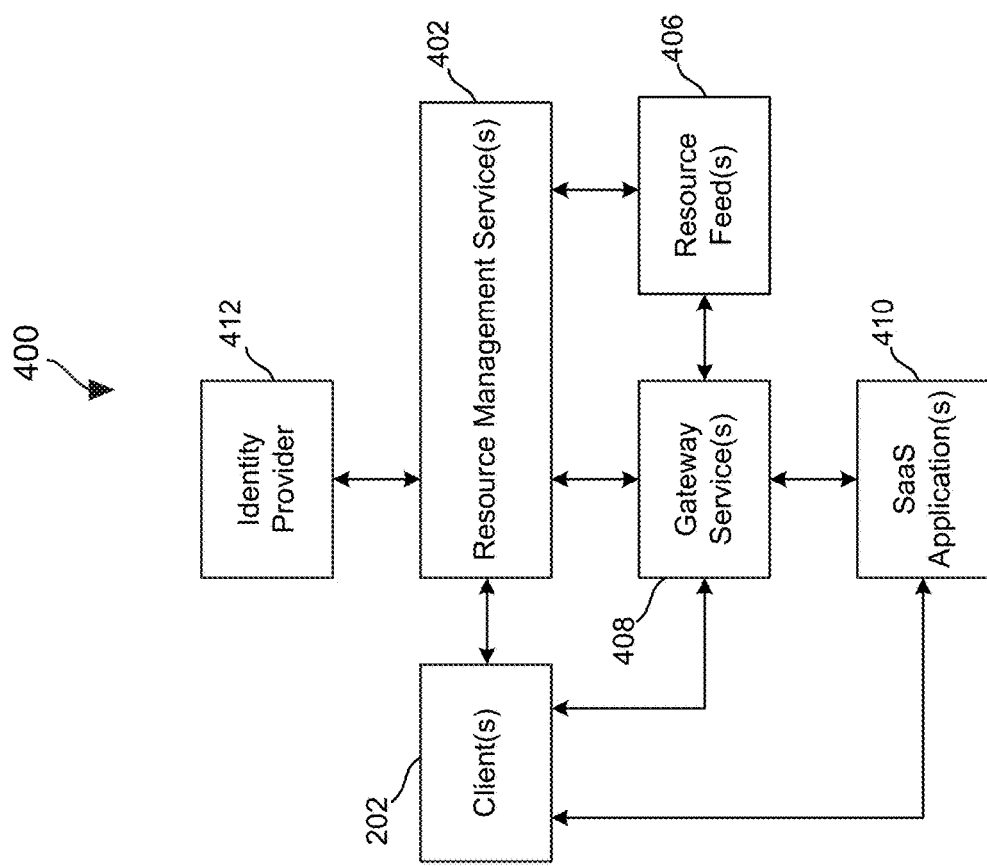
FIG. 4A is a block diagram of an example system in which resource management services may manage and streamline access by clients to resource feeds (via one or more gateway services) and/or software-as-a-service (SaaS) applications.

D. Systems and Methods for Managing and Streamlining Access by Client Devices to a Variety of Resources FIG. 4A is a block diagram of an example system 400 in which one or more resource management services 402 may manage and streamline access by one or more clients 202 to one or more resource feeds 406 (e.g., activity feed 104 of FIGS. 1A and 1B) via one or more gateway services 408, and/or one or more software-as-a-service (SaaS) applications 410. In particular, the resource management service(s) 402 may employ an identity provider 412 to authenticate the identity of a user of a client 202 and, following authentication, identify one of more resources the user is authorized to access. In response to the user selecting one of the identified resources, the resource management service(s) 402 may send appropriate access credentials to the requesting client 202, and the client 202 may then use those credentials to access the selected resource. For the resource feed(s) 406, the client 202 may use the supplied credentials to access the selected resource via a gateway service 408. For the SaaS application(s) 410, the client 202 may use the credentials to access the selected application directly.

The client(s) 202 may be any type of computing devices capable of accessing the resource feed(s) 406 and/or the SaaS application(s) 410, and may, for example, include a variety of desktop or laptop computers, smartphones, tablets, etc. The resource feed(s) 406 may include any of numerous resource types and may be provided from any of numerous locations. In some embodiments, for example, the resource feed(s) 406 may include one or more systems or services for providing virtual applications and/or desktops to the client(s) 202, one or more file repositories and/or file sharing systems, one or more secure browser services, one or more access control services for the SaaS applications 410, one or more management services for local applications on the client(s) 202, one or more internet enabled devices or sensors, etc. Each of the resource management service(s) 402, the resource feed(s) 406, the gateway service(s) 408, the SaaS application(s) 410, and the identity provider 412 may be located within an on-premises data center of an organization for which the system 400 is deployed, within one or more cloud computing environments, or elsewhere.

Figure 4B:
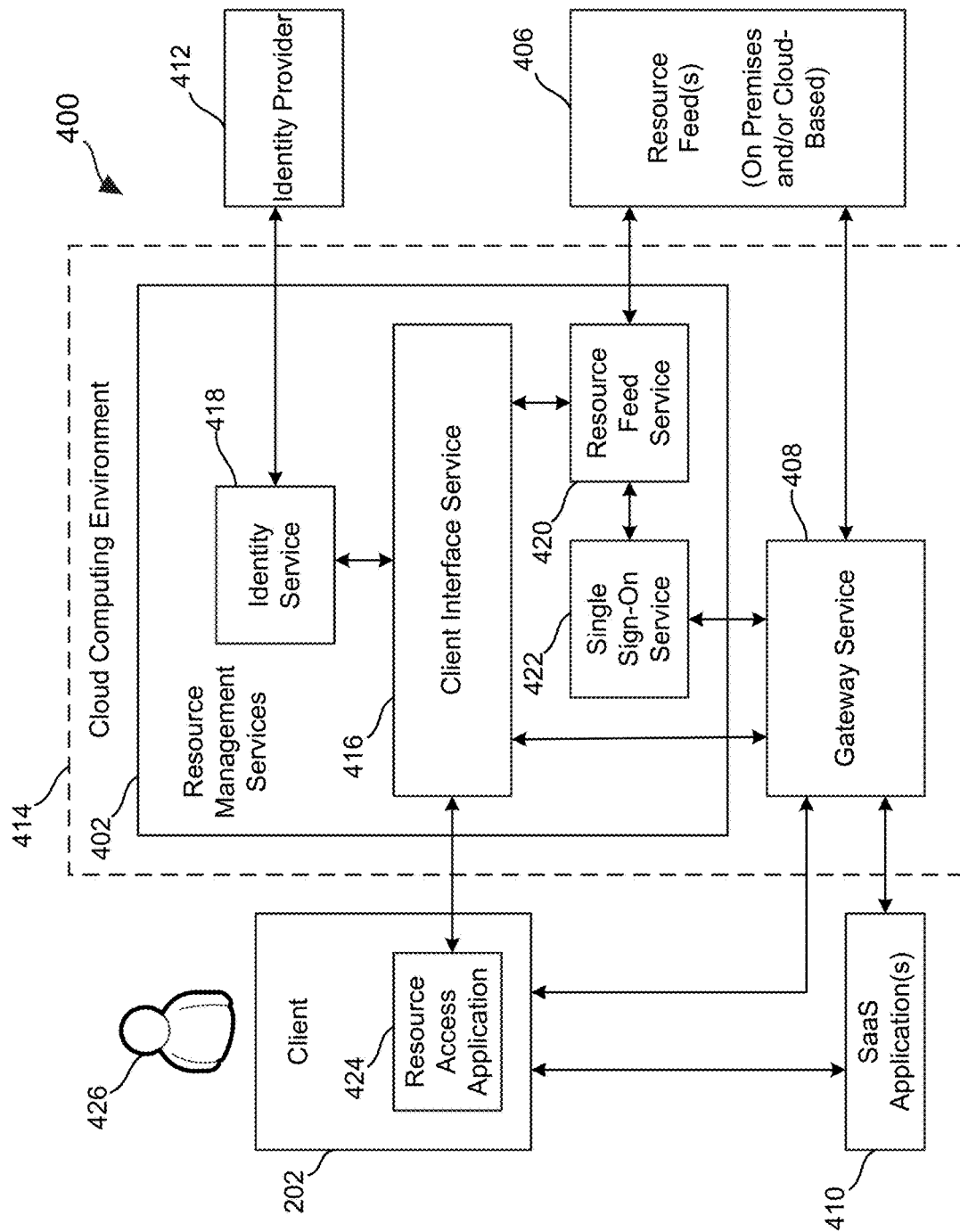
FIG. 4B is a block diagram showing an example implementation of the system shown in FIG. 4A in which various resource management services as well as a gateway service are located within a cloud computing environment.

FIG. 4B is a block diagram showing an example implementation of the system 400 shown in FIG. 4A in which various resource management services 402 as well as a gateway service 408 are located within a cloud computing environment 414. The cloud computing environment may, for example, include Microsoft Azure Cloud, Amazon Web Services, Google Cloud, or IBM Cloud.

For any of the illustrated components (other than the client 202) that are not based within the cloud computing environment 414, cloud connectors (not shown in FIG. 4B) may be used to interface those components with the cloud computing environment 414. Such cloud connectors may, for example, run on Windows Server instances hosted in resource locations and may create a reverse proxy to route traffic between the site(s) and the cloud computing environment 414. In the illustrated example, the cloud-based resource management services 402 include a client interface service 416, an identity service 418, a resource feed service 420, and a single sign-on service 422. As shown, in some embodiments, the client 202 may use a resource access application 424 to communicate with the client interface service 416 as well as to present a user interface on the client 202 that a user 426 can operate to access the resource feed(s) 406 and/or the SaaS application(s) 410. The resource access application 424 may either be installed on the client 202, or may be executed by the client interface service 416 (or elsewhere in the system 400) and accessed using a web browser (not shown in FIG. 4B) on the client 202.

As explained in more detail below, in some embodiments, the resource access application 424 and associated components may provide the user 426 with a personalized, all-in-one interface enabling instant and seamless access to all the user's SaaS and web applications, files, virtual Windows applications, virtual Linux applications, desktops, mobile applications, Citrix Virtual Apps and Desktops™, local applications, and other data.

When the resource access application 424 is launched or otherwise accessed by the user 426, the client interface service 416 may send a sign-on request to the identity service 418. In some embodiments, the identity provider 412 may be located on the premises of the organization for which the system 400 is deployed. The identity provider 412 may, for example, correspond to an on-premises Windows Active Directory. In such embodiments, the identity provider 412 may be connected to the cloud-based identity service 418 using a cloud connector (not shown in FIG. 4B), as described above. Upon receiving a sign-on request, the identity service 418 may cause the resource access application 424 (via the client interface service 416) to prompt the user 426 for the user's authentication credentials (e.g., user-name and password). Upon receiving the user's authentication credentials, the client interface service 416 may pass the credentials along to the identity service 418, and the identity service 418 may, in turn, forward them to the identity provider 412 for authentication, for example, by comparing them against an Active Directory domain. Once the identity service 418 receives confirmation from the identity provider 412 that the user's identity has been properly authenticated, the client interface service 416 may send a request to the resource feed service 420 for a list of subscribed resources for the user 426.

In other embodiments (not illustrated in FIG. 4B), the identity provider 412 may be a cloud-based identity service, such as a Microsoft Azure Active Directory. In such embodiments, upon receiving a sign-on request from the client interface service 416, the identity service 418 may, via the client interface service 416, cause the client 202 to be redirected to the cloud-based identity service to complete an authentication process. The cloud-based identity service may then cause the client 202 to prompt the user 426 to enter the user's authentication credentials. Upon determining the user's identity has been properly authenticated, the cloud-based identity service may send a message to the resource access application 424 indicating the authentication attempt was successful, and the resource access application 424 may then inform the client interface service 416 of the successfully authentication. Once the identity service 418 receives confirmation from the client interface service 416 that the user's identity has been properly authenticated, the client interface service 416 may send a request to the resource feed service 420 for a list of subscribed resources for the user 426.

For each configured resource feed, the resource feed service 420 may request an identity token from the single sign-on service 422. The resource feed service 420 may then pass the feed-specific identity tokens it receives to the points of authentication for the respective resource feeds 406. Each resource feed 406 may then respond with a list of resources configured for the respective identity. The resource feed service 420 may then aggregate all items from the different feeds and forward them to the client interface service 416, which may cause the resource access application 424 to present a list of available resources on a user interface of the client 202. The list of available resources may, for example, be presented on the user interface of the client 202 as a set of selectable icons or other elements corresponding to accessible resources. The resources so identified may, for example, include one or more virtual applications and/or desktops (e.g., Citrix Virtual Apps and Desktops™, VMware Horizon, Microsoft RDS, etc.), one or more file repositories and/or file sharing systems (e.g., Sharefile®, one or more secure browsers, one or more internet enabled devices or sensors, one or more local applications installed on the client 202, and/or one or more SaaS applications 410 to which the user 426 has subscribed. The lists of local applications and the SaaS applications 410 may, for example, be supplied by resource feeds 406 for respective services that manage which such applications are to be made available to the user 426 via the resource access application 424. Examples of SaaS applications 410 that may be managed and accessed as described herein include Microsoft Office 365 applications, SAP SaaS applications, Workday applications, etc.

For resources other than local applications and the SaaS application(s) 410, upon the user 426 selecting one of the listed available resources, the resource access application 424 may cause the client interface service 416 to forward a request for the specified resource to the resource feed service 420. In response to receiving such a request, the resource feed service 420 may request an identity token for the corresponding feed from the single sign-on service 422. The resource feed service 420 may then pass the identity token received from the single sign-on service 422 to the client interface service 416 where a launch ticket for the resource may be generated and sent to the resource access application 424. Upon receiving the launch ticket, the resource access application 424 may initiate a secure session to the gateway service 408 and present the launch ticket. When the gateway service 408 is presented with the launch ticket, it may initiate a secure session to the appropriate resource feed and present the identity token to that feed to seamlessly authenticate the user 426. Once the session initializes, the client 202 may proceed to access the selected resource.

When the user 426 selects a local application, the resource access application 424 may cause the selected local application to launch on the client 202. When the user 426 selects a SaaS application 410, the resource access application 424 may cause the client interface service 416 to request a one-time uniform resource locator (URL) from the gateway service 408 as well a preferred browser for use in accessing the SaaS application 410. After the gateway service 408 returns the one-time URL and identifies the preferred browser, the client interface service 416 may pass that information along to the resource access application 424. The client 202 may then launch the identified browser and initiate a connection to the gateway service 408. The gateway service 408 may then request an assertion from the single sign-on service 422. Upon receiving the assertion, the gateway service 408 may cause the identified browser on the client 202 to be redirected to the logon page for identified SaaS application 410 and present the assertion. The SaaS may then contact the gateway service 408 to validate the assertion and authenticate the user 426. Once the user has been authenticated, communication may occur directly between the identified browser and the selected SaaS application 410, thus allowing the user 426 to use the client 202 to access the selected SaaS application 410.

In some embodiments, the preferred browser identified by the gateway service 408 may be a specialized browser embedded in the resource access application 424 (when the resource application is installed on the client 202) or provided by one of the resource feeds 406 (when the resource access application 424 is located remotely), e.g., via a secure browser service. In such embodiments, the SaaS applications 410 may incorporate enhanced security policies to enforce one or more restrictions on the embedded browser. Examples of such policies include (1) requiring use of the specialized browser and disabling use of other local browsers, (2) restricting clipboard access, e.g., by disabling cut/copy/paste operations between the application and the clipboard, (3) restricting printing, e.g., by disabling the ability to print from within the browser, (3) restricting navigation, e.g., by disabling the next and/or back browser buttons, (4) restricting downloads, e.g., by disabling the ability to download from within the SaaS application, and (5) displaying watermarks, e.g., by overlaying a screen-based watermark showing the username and IP address associated with the client 202 such that the watermark will appear as displayed on the screen if the user tries to print or take a screenshot. Further, in some embodiments, when a user selects a hyperlink within a SaaS application, the specialized browser may send the URL for the link to an access control service (e.g., implemented as one of the resource feed(s) 406) for assessment of its security risk by a web filtering service. For approved URLs, the specialized browser may be permitted to access the link. For suspicious links, however, the web filtering service may have the client interface service 416 send the link to a secure browser service, which may start a new virtual browser session with the client 202, and thus allow the user to access the potentially harmful linked content in a safe environment.

In some embodiments, in addition to or in lieu of providing the user 426 with a list of resources that are available to be accessed individually, as described above, the user 426 may instead be permitted to choose to access a streamlined feed of event notifications and/or available actions that may be taken with respect to events that are automatically detected with respect to one or more of the resources. This streamlined resource activity feed, which may be customized for each user 426, may allow users to monitor important activity involving all of their resources—SaaS applications, web applications, Windows applications, Linux applications, desktops, file repositories and/or file sharing systems, and other data through a single interface, without needing to switch context from one resource to another. Further, event notifications in a resource activity feed may be accompanied by a discrete set of user-interface elements, e.g., "approve," "deny," and "see more detail" buttons, allowing a user to take one or more simple actions with respect to each event right within the user's feed. In some embodiments, such a streamlined, intelligent resource activity feed may be enabled by one or more micro-applications, or "microapps," that can interface with underlying associated resources using APIs or the like. The responsive actions may be user-initiated activities that are taken within the microapps and that provide inputs to the underlying applications through the API or other interface. The actions a user performs within the microapp may, for example, be designed to address specific common problems and use cases quickly and easily, adding to increased user productivity (e.g., request personal time off, submit a help desk ticket, etc.). In some embodiments, notifications from such event-driven microapps may additionally or alternatively be pushed to clients 202 to notify a user 426 of something that requires the user's attention (e.g., approval of an expense report, new course available for registration, etc.).

Figure 4C:
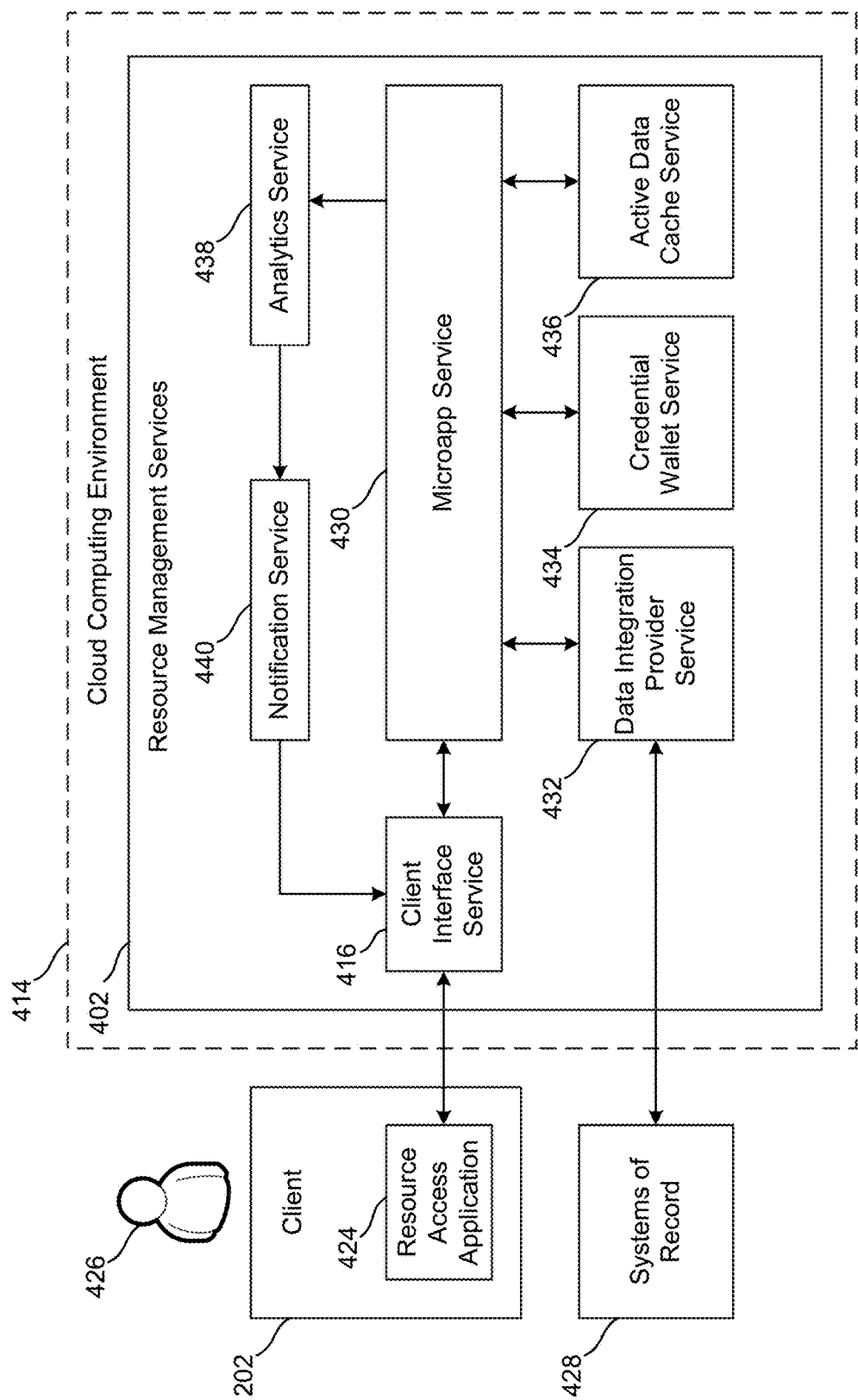
FIG. 4C is a block diagram similar to that shown in FIG. 4B but in which the available resources are represented by a single box labeled "systems of record," and further in which several different services are included among the resource management services.

FIG. 4C is a block diagram similar to that shown in FIG. 4B but in which the available resources (e.g., SaaS applications, web applications, Windows applications, Linux applications, desktops, file repositories and/or file sharing systems, and other data) are represented by a single box 428 labeled "systems of record," and further in which several different services are included within the resource management services block 402. As explained below, the services shown in FIG. 4C may enable the provision of a streamlined resource activity feed and/or notification process for a client 202. In the example shown, in addition to the client interface service 416 discussed above, the illustrated services include a microapp service 430, a data integration provider service 432, a credential wallet service 434, an active data cache service 436, an analytics service 438, and a notification service 440. In various embodiments, the services shown in FIG. 4C may be employed either in addition to or instead of the different services shown in FIG. 4B.

In some embodiments, a microapp may be a single use case made available to users to streamline functionality from complex enterprise applications. Microapps may, for example, utilize APIs available within SaaS, web, or homegrown applications allowing users to see content without needing a full launch of the application or the need to switch context. Absent such microapps, users would need to launch an application, navigate to the action they need to perform, and then perform the action. Microapps may streamline routine tasks for frequently performed actions and provide users the ability to perform actions within the resource access application 424 without having to launch the native application. The system shown in FIG. 4C may, for example, aggregate relevant notifications, tasks, and insights, and thereby give the user 426 a dynamic productivity tool. In some embodiments, the resource activity feed may be intelligently populated by utilizing machine learning and artificial intelligence (AI) algorithms. Further, in some implementations, microapps may be configured within the cloud computing environment 414, thus giving administrators a powerful tool to create more productive workflows, without the need for additional infrastructure. Whether pushed to a user or initiated by a user, microapps may provide short cuts that simplify and streamline key tasks that would otherwise require opening full enterprise applications. In some embodiments, out-of-the-box templates may allow administrators with API account permissions to build microapp solutions targeted for their needs. Administrators may also, in some embodiments, be provided with the tools they need to build custom microapps.

Referring to FIG. 4C, the systems of record 428 may represent the applications and/or other resources the resource management services 402 may interact with to create microapps. These resources may be SaaS applications, legacy applications, or homegrown applications, and can be hosted on-premises or within a cloud computing environment. Connectors with out-of-the-box templates for several applications may be provided and integration with other applications may additionally or alternatively be configured through a microapp page builder. Such a microapp page builder may, for example, connect to legacy, on-premises, and SaaS systems by creating streamlined user workflows via microapp actions. The resource management services 402, and in particular the data integration provider service 432, may, for example, support REST API, JSON, OData-JSON, and 6ML. As explained in more detail below, the data integration provider service 432 may also write back to the systems of record, for example, using OAuth2 or a service account.

In some embodiments, the microapp service 430 may be a single-tenant service responsible for creating the microapps. The microapp service 430 may send raw events, pulled from the systems of record 428, to the analytics service 438 for processing. The microapp service may, for example, periodically pull active data from the systems of record 428.

In some embodiments, the active data cache service 436 may be single-tenant and may store all configuration information and microapp data. It may, for example, utilize a per-tenant database encryption key and per-tenant database credentials.

In some embodiments, the credential wallet service 434 may store encrypted service credentials for the systems of record 428 and user OAuth2 tokens.

In some embodiments, the data integration provider service 432 may interact with the systems of record 428 to decrypt end-user credentials and write back actions to the systems of record 428 under the identity of the end-user. The write-back actions may, for example, utilize a user's actual account to ensure all actions performed are compliant with data policies of the application or other resource being interacted with.

In some embodiments, the analytics service 438 may process the raw events received from the microapp service 430 to create targeted scored notifications and send such notifications to the notification service 440.

Finally, in some embodiments, the notification service 440 may process any notifications it receives from the analytics service 438. In some implementations, the notification service 440 may store the notifications in a database to be later served in an activity feed. In other embodiments, the notification service 440 may additionally or alternatively send the notifications out immediately to the client 202 as a push notification to the user 426.

In some embodiments, a process for synchronizing with the systems of record 428 and generating notifications may operate as follows. The microapp service 430 may retrieve encrypted service account credentials for the systems of record 428 from the credential wallet service 434 and request a sync with the data integration provider service 432. The data integration provider service 432 may then decrypt the service account credentials and use those credentials to retrieve data from the systems of record 428. The data integration provider service 432 may then stream the retrieved data to the microapp service 430. The microapp service 430 may store the received systems of record data in the active data cache service 436 and also send raw events to the analytics service 438. The analytics service 438 may create targeted scored notifications and send such notifications to the notification service 440. The notification service 440 may store the notifications in a database to be later served in an activity feed and/or may send the notifications out immediately to the client 202 as a push notification to the user 426.

In some embodiments, a process for processing a user-initiated action via a microapp may operate as follows. The client 202 may receive data from the microapp service 430 (via the client interface service 416) to render information corresponding to the microapp. The microapp service 430 may receive data from the active data cache service 436 to support that rendering. The user 426 may invoke an action from the microapp, causing the resource access application 424 to send that action to the microapp service 430 (via the client interface service 416). The microapp service 430 may then retrieve from the credential wallet service 434 an encrypted Oauth2 token for the system of record for which the action is to be invoked, and may send the action to the data integration provider service 432 together with the encrypted Oath2 token. The data integration provider service 432 may then decrypt the Oath2 token and write the action to the appropriate system of record under the identity of the user 426. The data integration provider service 432 may then read back changed data from the written-to system of record and send that changed data to the microapp service 430. The microapp service 430 may then update the active data cache service 436 with the updated data and cause a message to be sent to the resource access application 424 (via the client interface service 416) notifying the user 426 that the action was successfully completed.

In some embodiments, in addition to or in lieu of the functionality described above, the resource management services 402 may provide users the ability to search for relevant information across all files and applications. A simple keyword search may, for example, be used to find application resources, SaaS applications, desktops, files, etc. This functionality may enhance user productivity and efficiency as application and data sprawl is prevalent across all organizations.

In other embodiments, in addition to or in lieu of the functionality described above, the resource management services 402 may enable virtual assistance functionality that allows users to remain productive and take quick actions. Users may, for example, interact with the "Virtual Assistant" and ask questions such as "What is Bob Smith's phone number?" or "What absences are pending my approval?" The resource management services 402 may, for example, parse these requests and respond because they are integrated with multiple systems on the back-end. In some embodiments, users may be able to interact with the virtual assistant through either the resource access application 424 or directly from another resource, such as Microsoft Teams. This feature may allow employees to work efficiently, stay organized, and deliver only the specific information they're looking for.

Figure 4D:
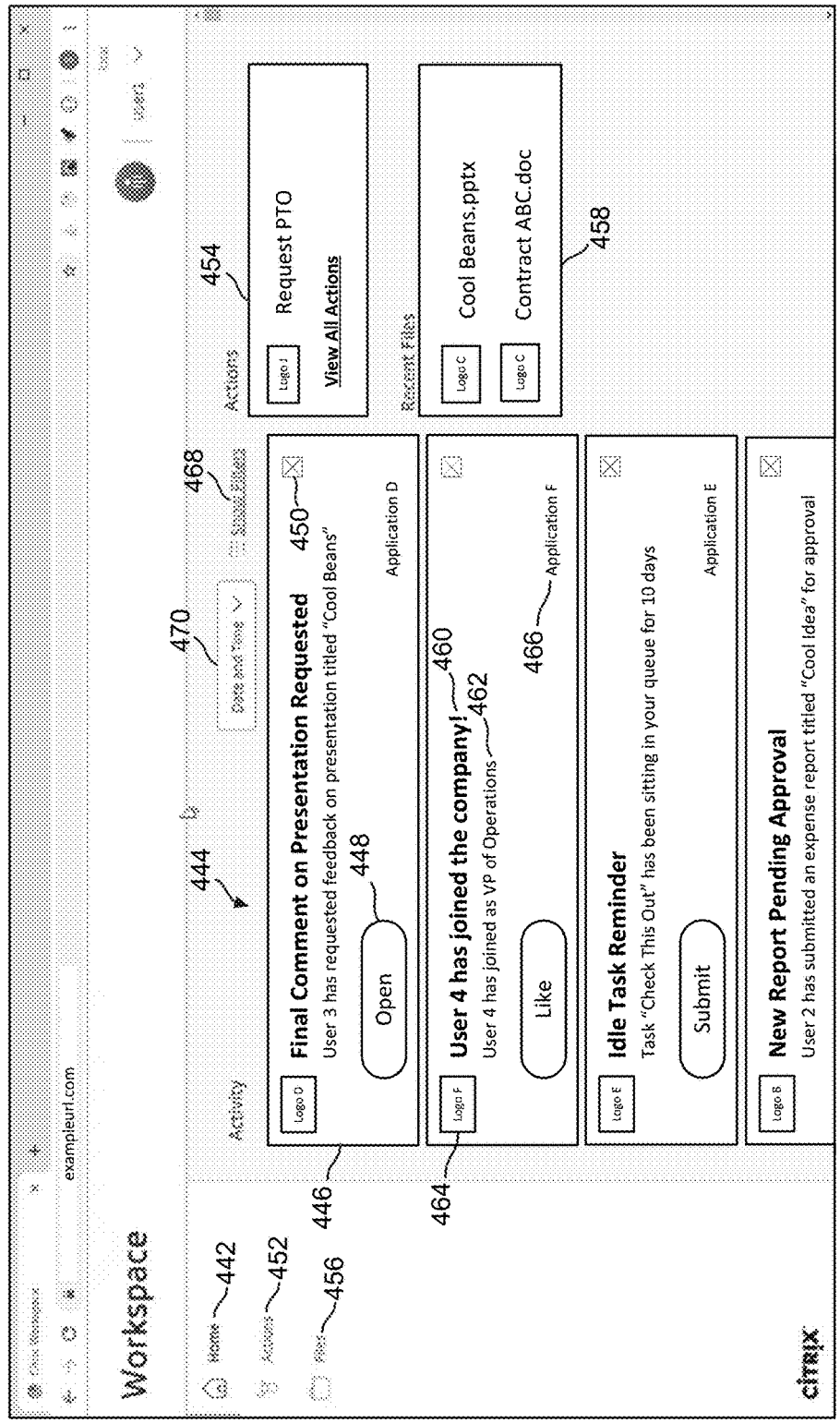
FIG. 4D shows how a display screen may appear when an intelligent activity feed feature of a multi-resource management system, such as that shown in FIG. 4C, is employed.

FIG. 4D shows how a display screen 440 presented by a resource access application 422 (shown in FIG. 4C) may appear when an intelligent activity feed feature is employed and a user is logged on to the system. Such a screen may be provided, for example, when the user clicks on or otherwise selects a "home" user interface element 442. As shown, an activity feed 444 may be presented on the screen 440 that includes a plurality of notifications 446 about respective events that occurred within various applications to which the user has access rights. An example implementation of a system capable of providing an activity feed 444 like that shown is described above in connection with FIG. 4C. As explained above, a user's authentication credentials may be used to gain access to various systems of record (e.g., SalesForce, Ariba, Concur, RightSignature, etc.) with which the user has accounts, and events that occur within such systems of record may be evaluated to generate notifications 446 to the user concerning actions that the user can take relating to such events. As shown in FIG. 4D, in some implementations, the notifications 446 may include a title 460 and a body 462, and may also include a logo 464 and/or a name 466 of the system or record to which the notification 446 corresponds, thus helping the user understand the proper context with which to decide how best to respond to the notification 446. In some implementations, one of more filters may be used to control the types, date ranges, etc., of the notifications 446 that are presented in the activity feed 444. The filters that can be used for this purpose may be revealed, for example, by clicking on or otherwise selecting the "show filters" user interface element 468. Further, in some embodiments, a user interface element 470 may additionally or alternatively be employed to select a manner in which the notifications 446 are sorted within the activity feed. In some implementations, for example, the notifications 446 may be sorted in accordance with the "date and time" they were created (as shown for the element 470 in FIG. 4D) and/or an "application" mode (not illustrated) may be selected (e.g., using the element 470) in which the notifications 446 may be sorted by application type.

When presented with such an activity feed 444, the user may respond to the notifications 446 by clicking on or otherwise selecting a corresponding action element 448 (e.g., "Approve," "Reject," "Open," "Like," "Submit," etc.), or else by dismissing the notification, e.g., by clicking on or otherwise selecting a "close" element 450. As explained in connection with FIG. 4C below, the notifications 446 and corresponding action elements 448 may be implemented, for example, using "microapps" that can read and/or write data to systems of record using application programming interface (API) functions or the like, rather than by performing full launches of the applications for such systems of record. In some implementations, a user may additionally or alternatively view additional details concerning the event that triggered the notification and/or may access additional functionality enabled by the microapp corresponding to the notification 446 (e.g., in a separate, pop-up window corresponding to the microapp) by clicking on or otherwise selecting a portion of the notification 446 other than one of the user-interface elements 448, 450. In some embodiments, the user may additionally or alternatively be able to select a user interface element either within the notification 446 or within a separate window corresponding to the microapp that allows the user to launch the native application to which the notification relates and respond to the event that prompted the notification via that native application rather than via the microapp. In addition to the event-driven actions accessible via the action elements 448 in the notifications 446, a user may alternatively initiate microapp actions by selecting a desired action, e.g., via a drop-down menu accessible using the "action" user-interface element 452 or by selecting a desired action from a list 454 of recently and/or commonly used microapp actions. As shown, the user may also access files (e.g., via a Citrix ShareFile™ platform) by selecting a desired file, e.g., via a drop-down menu accessible using the "files" user interface element 456 or by selecting a desired file from a list 458 of recently and/or commonly used files.

Although not shown in FIG. 4D, it should be appreciated that, in some implementations, additional resources may also be accessed through the screen 440 by clicking on or otherwise selecting one or more other user interface elements that may be presented on the screen. For example, in some embodiments, one or more virtualized applications may be accessible (e.g., via a Citrix Virtual Apps and Desktops™ service) by clicking on or otherwise selecting an "apps" user-interface element (not shown) to reveal a list of accessible applications and/or one or more virtualized desktops may be accessed (e.g., via a Citrix Virtual Apps and Desktops™ service) by clicking on or otherwise selecting a "desktops" user-interface element (not shown) to reveal a list of accessible desktops.

The activity feed shown in FIG. 4D provides significant benefits, as it allows a user to respond to application-specific events generated by disparate systems of record without needing to navigate to, launch, and interface with multiple different native applications.

Figure 5:
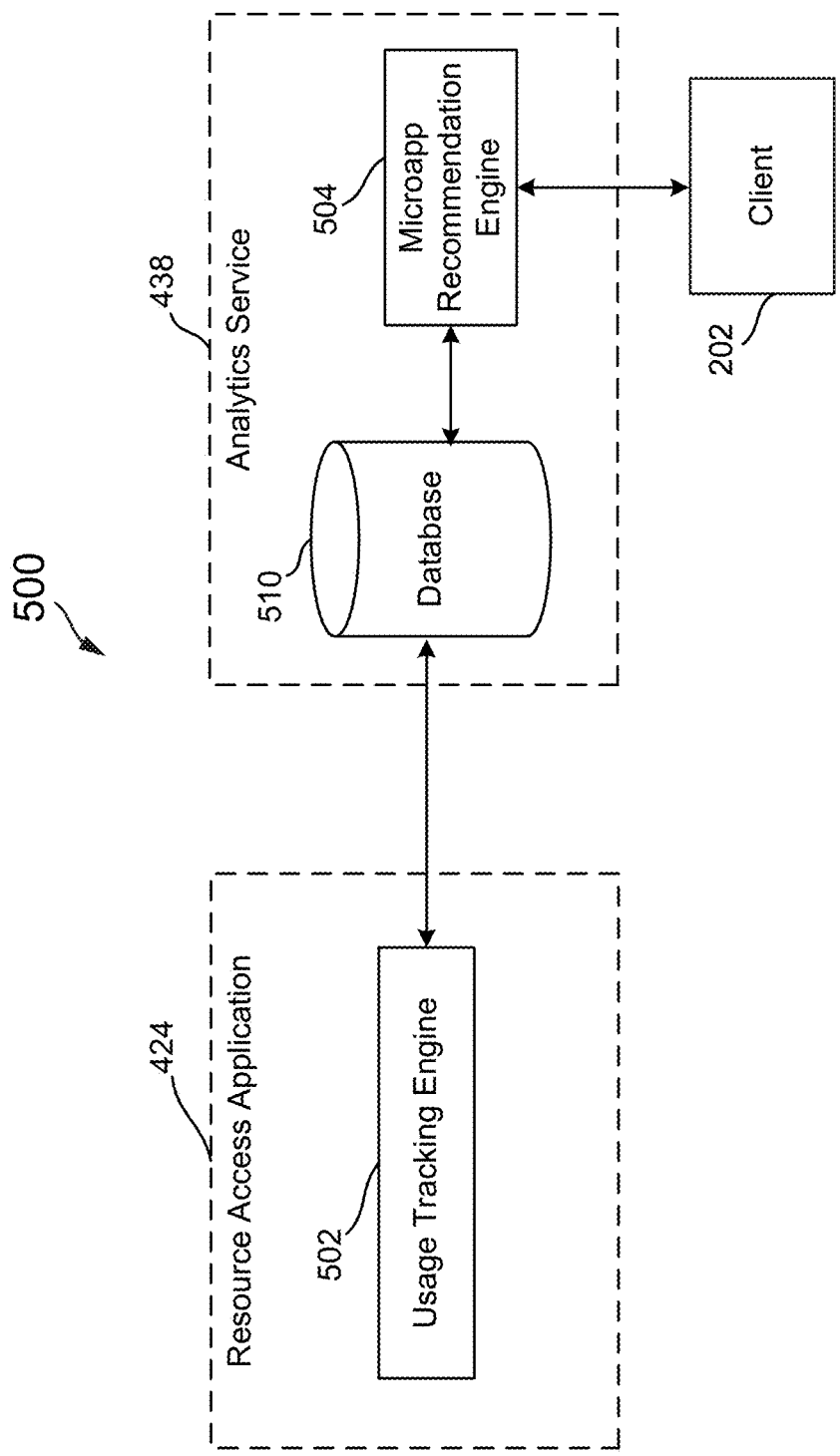
FIG. 5 is a block diagram of an example system for tracking user interactions with an application and a form and providing a recommendation score for creating a microapp corresponding to the application or the form in accordance with some embodiments.

E. Detailed Description of Example Embodiments of Systems for Tracking Application Usage for Microapp Recommendations FIG. 5 is a block diagram of an example system 500 for tracking user interactions with an application and a form and providing a recommendation score for creating a microapp corresponding to the application and/or the form. As shown, the system 500 may include a usage tracking engine 502, a microapp recommendation engine 504, and a database 510. At a high level, the usage tracking engine 502 may be responsible for monitoring the beginning and ending of user interactions with a form of an application and storing interaction data representing the user interactions in the database 510. The usage tracking engine 502 may, for example, determine an amount of time a user spends interacting with the form, which interface elements of the form the user interacts with, and what input values the user provides via the interface elements. The microapp recommendation engine 504 may be responsible for determining a recommendation score for creating a microapp corresponding to the form, where the determination may be made using interaction data from multiple different users and multiple different interactions. The microapp recommendation engine 504 may also recommend which interface elements of the form should be included in the microapp based on the way different users interact with the interface elements. The microapp recommendation engine 504 may, for example, provide a list of applications and forms for creating microapps to an administrator or other user via a dashboard at the client device 202. An example of such a dashboard is described below in connection with FIG. 9.

As illustrated in FIG. 5, in some embodiments, the usage tracking engine 502 may be included within or operate in conjunction with an application executing on a client 202, such as the resource access application 424 described above in connection with FIG. 4C. An instance of the usage tracking engine 502 may be included within or operate in conjunction with the first device 102 to record interaction data corresponding to the first user's 104 interactions with multiple different forms and multiple different applications. Another instance of the usage tracking engine 502 may be included within or operate in conjunction with the second device 106 to record interaction data corresponding to the second user's 108 interactions with multiple different forms and multiple different applications. As illustrated, in some embodiments, the microapp recommendation engine 504 may be included within or operate in conjunction with the analytics service 438 described above in connection with FIG. 4C.

Figure 6:
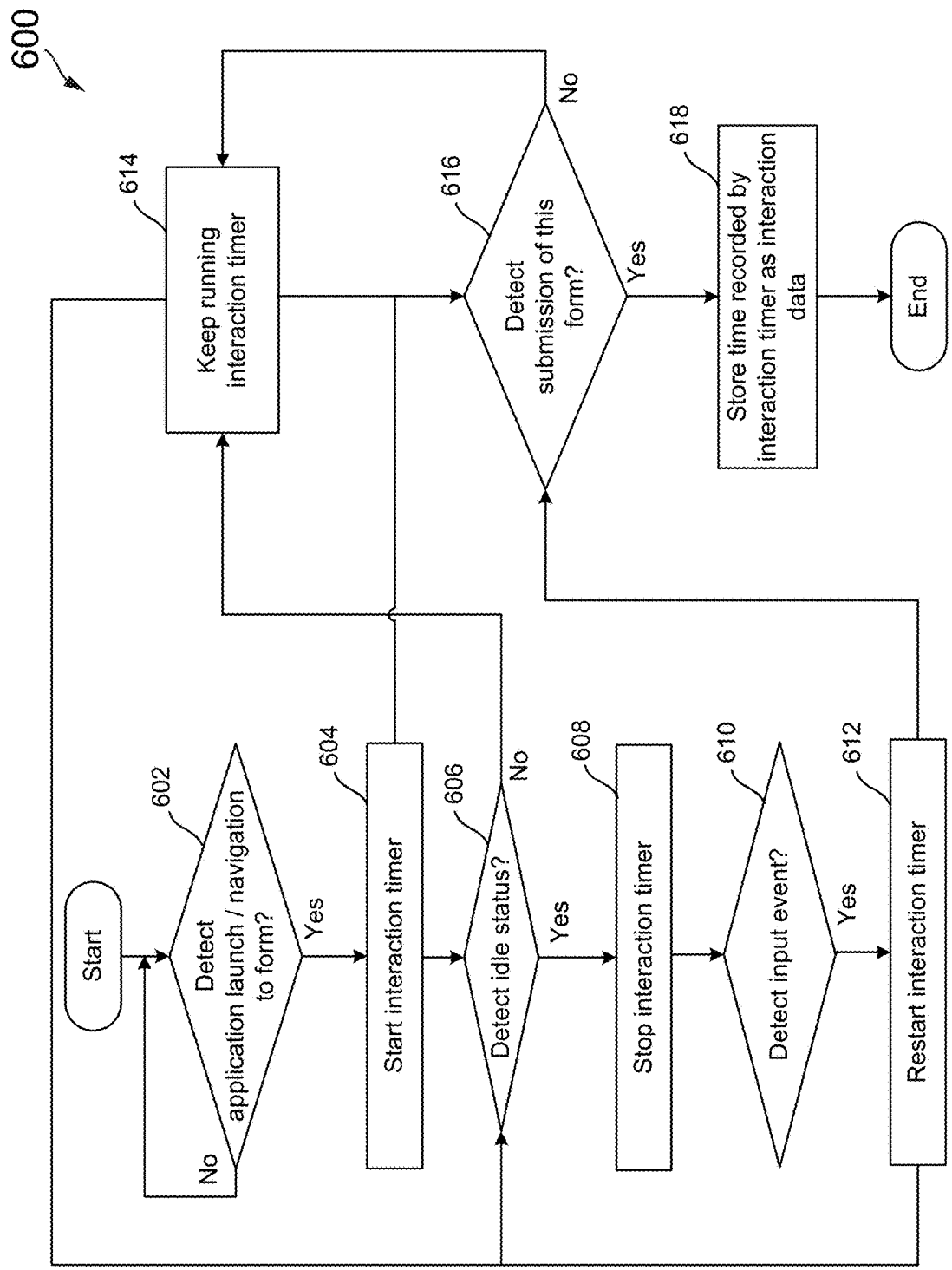
FIG. 6 is a flowchart showing an example routine that may be performed by the usage tracking engine shown in FIG. 5 in accordance with some embodiments.
Figure 7:
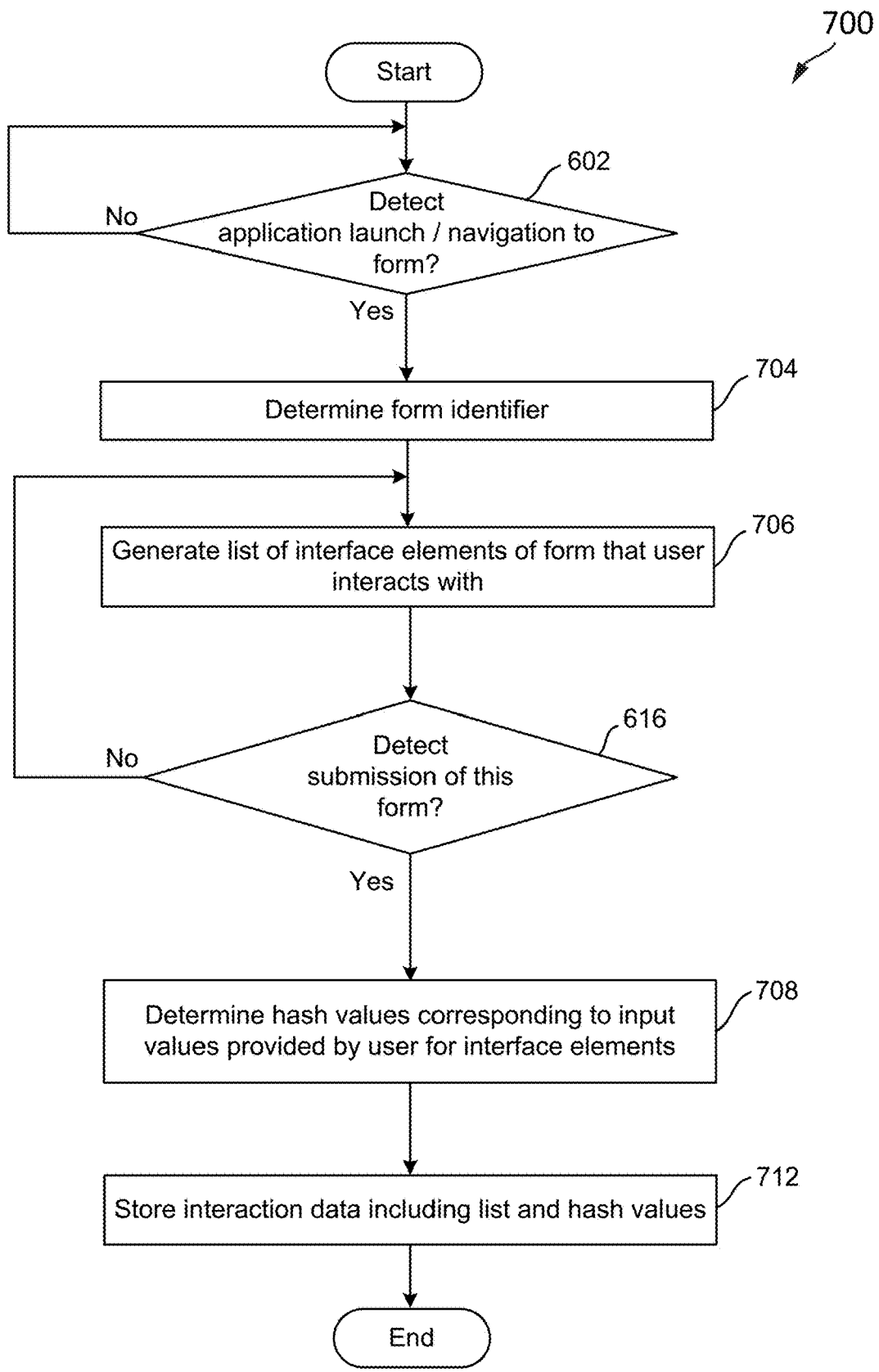
FIG. 7 is a flowchart showing an example routine that may be performed by the usage tracking engine shown in FIG. 5 in accordance with some embodiments.
Figure 8:
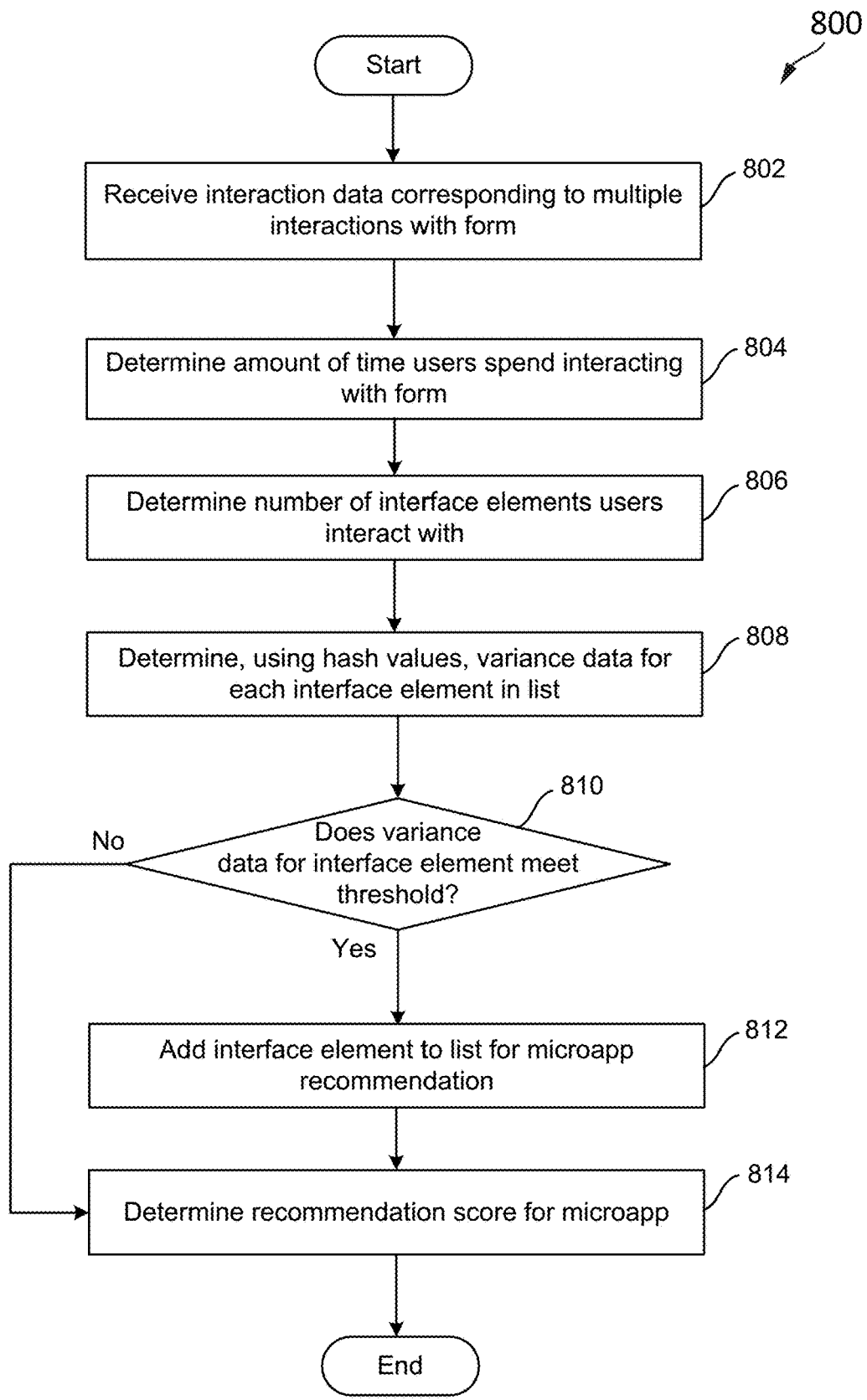
FIG. 8 is a flowchart showing an example routine that may be performed by the microapp recommendation engine shown in FIG. 5 in accordance with some embodiments.

FIGS. 6 and 7 are flowcharts showing example routines 600 and 700 that may be performed by the usage tracking engine 502 of the system 500 to measure and record the amount of time a user of the resource access application 424 spends interacting with a form of an application, and to record which interface elements the user interacts with, as well as input values provided by the user. FIG. 8 is a flowchart showing example routine 800 that may be performed by the microapp recommendation engine 504 of the system 500 to determine a recommendation score for creating a microapp for a form (for example, form 150 shown in FIG. 1B).

The various steps of the routines 600, 700, and 800 described herein may be implemented, for example, by one or more processors that execute instructions encoded on one or more computer-readable media. Such processor(s) and computer readable medium(s) may, for example, be included in or operate in conjunction with the client 202 and/or the cloud computing environment 414 described above in connection with FIG. 4C. The operation of the routines 600, 700, and 800, will now be described in more detail.

Referring first to FIG. 6, when the usage tracking engine 502 detects (at a decision step 602) that a user has launched an application and/or navigated to a form, the routine 600 may proceed to a step 604. As explained in connection with FIG. 4B above, in some implementations, the user 426 may access one or more applications (e.g., a SaaS application 410) via a specialized browser embedded in the resource access application 424 included in the client device 202. In some implementations, when a user 104, 108, 426 launches an application/form or navigates to another application/form, background and content scripts may be loaded into the embedded browser and various event handlers may be activated to monitor and track the user's interactions with the form. In some embodiments, for example, the event handlers may include Browser Navigation handler, MutationObserver, EventListener, other event handlers to detect mouse/keyboard inputs (and/or other forms of inputs, such as, touchscreen, gestures, spoken commands, etc.), and/or other types of event handlers to detect document object model (DOM) changes with respect to the form. In some embodiments, the application may be hosted by a remote server, other than the computing system that includes the microapp recommendation engine 504.

The usage tracking engine 502 may start (at a step 604) an interaction timer to track the amount of time the user spends interacting with the form. In some implementations, each form of an application may be associated with its own interaction timer. Prior to the step 604, the interaction timer for the form may be set to 0 seconds, and at the step 604 the interaction timer may start incrementing in terms of seconds or some other unit of time. The usage tracking engine 502 may operate the interaction timer using event handlers or other code included in the embedded browser.

After the interaction timer starts, the usage tracking engine 502 may proceed to each of decision steps 606 and 616. At the decision step 606, the usage tracking engine 502 may detect an idle status indicating whether the user has stopped interacting with the form. If an idle status is detected, then the routine 600 may proceed to a step 608. At the step 608, the usage tracking engine 502 may stop the interaction timer to account for idle time when the user is not interacting with the form. If, at the decision step 606, an idle status is not detected, then the routine 600 may proceed to a step 614. At the step 614, the usage tracking engine 502 may keep the interaction timer running. In some embodiments, the decision step 606 to detect idle status may be performed periodically, e.g., every 5 seconds. An idle status may be detected, for example, based on the embedded browser not receiving a mouse/keyboard event for a given period of time. An idle status may additionally or alternatively be detected based on the embedded browser detecting another application window to be active (e.g., wherein another application is in the foreground, and the present application/form is in the background) at the client device 202.

After the step 608, when the usage tracking engine 502 detects (at a decision step 610) an input event with respect to the form, the routine 600 may proceed to a step 612. In some implementations, the input event may be receipt of an input via a mouse, a keyboard, or a touchscreen (for example, of a mobile device). In other implementations, the input event may include detection of a gesture (that may be derived from captured image data), a spoken command/input (that may be derived from captured audio data), or other forms of input. At the step 612, the usage tracking engine 502 may restart the interaction timer for the form. In this manner, the usage tracking engine 502 may be capable of keeping an accurate time count of user interaction with the form, accounting for any idle time. In some embodiments, if the usage tracking engine 502 does not detect a mouse/keyboard event with respect to the form after a given period of time, the usage tracking engine 502 may determine that the user has abandoned the task and stopped interacting with the form. In some embodiments, if the usage tracking engine 502 detects the form/application being closed/exited by the user, then the usage tracking engine 502 may discard the time count of the interaction timer and any other interaction data recorded with respect to the instant interaction. Interaction data corresponding to an interaction where the user abandoned the task/form may not be helpful in determining a recommendation score based on user interactions with the form.

After the step 612, the routine 600 may proceed to each of the decision steps 606 and 616. After the step 614, the routine 600 may also proceed to each of the decision steps 606 and 616. When the usage tracking engine 502 detects (at the decision step 616) submission of the form, the routine 600 may proceed to a step 618, where the usage tracking engine 502 may stop the interaction timer for the form and store the time recorded by the interaction timer as interaction data. The interaction time/data may, for example, be associated with a form identifier corresponding to the form. In some embodiments, the interaction time/data may additionally or alternatively be associated with a user identifier. The usage tracking engine 502 may detect submission of the form when, for example, the user 104, 108 selects a button or provides an input via another type of interface element indicating the user has completed the form or has completed the interaction with the form. For example, selection of the "create" button 160 shown in FIG. 1B may be detected as submission of the form by the usage tracking engine 502. If submission of the form is not detected, then the routine 600 may proceed to the step 614 to keep the interaction timer running.

In this manner, the usage tracking engine 502 may track the amount of time spent by a user interacting with a form, by starting an interaction timer when a form is launched, by taking into account any idle time, and by stopping the interaction timer when the form is submitted.

FIG. 7 shows an example routine 700 that may, in some implementations, be executed by the usage tracking engine 502 to track user interactions with the form when the usage tracking engine 502 detects launch of an application or navigation to a form as described above in relation to the decision step 602 of FIG. 6. The routine 700 may be performed at the same time as the routine 600 to track user interactions with the form.

When launch of an application or navigation to a form is detected (at the decision step 602 of the routine 600 shown in FIG. 6), the routine 700 may proceed to a step 704, where the usage tracking engine 502 may determine a form identifier associated with the form that the user is interacting with. The form identifier may identify the form, and may be based on the application name/identifier, form title, form attributes or other information related to the form.

The routine 700 may then proceed to a step 706, where the usage tracking engine 502 may generate a list of interface elements of the form that the user interacts with. As discussed in connection with FIG. 1B, the form may include various interface elements, and the user may interact with some or all of the interface elements. The list of interface elements interacted with may, for example, identify the interface elements by a name/label of the interface element and a type of the interface element. For example, the interface element 152 shown in FIG. 1B may be identified in the list as an "input text field" labeled "Summary." In another example, the interface element 154 shown in FIG. 1B may be identified as a "drop down list" labeled "Defect Source."

When the usage tracking engine 502 detects (at the decision step 616 of the routine 600 shown in FIG. 6) submission of the form, the routine 700 may proceed to a step 708. At the step 708, the usage tracking engine 502 may determine a hash value corresponding to each input value provided by the user via the interface element(s) of the form. The hash value may be determined using a key, such as the form identifier or another key.

At a step 712, the usage tracking engine 502 may store interaction data corresponding to the instant user interaction with the form. The interaction data may include the list of interface elements the user interacted with (determined at the step 706) and/or may include the hash values corresponding to the input values provided by the user (determined at the step 708). The interaction data may additionally or alternatively include the interaction time determined at the step 618 of the routine 600 shown in FIG. 6. The interaction data may, for example, be associated with the form identifier and a user identifier identifying the user that interacted with the form. The user identifier may, for example, include a user name, a department within an organization that the user works in, a job title, and/or other information related to the user.

FIG. 8 shows an example routine 800 that may be executed by the microapp recommendation engine 504 (shown in FIG. 5) after interaction data corresponding to multiple users has been recorded according to the routines 600 and 700. At a step 802, the microapp recommendation engine 504 may receive interaction data corresponding to multiple interactions (from different users and/or the same user) with the form. The interaction data may, for example, be retrieved from the database 510 of the system 500. The interaction data may include first interaction data corresponding to a first user interacting with the form, second interaction data corresponding to a second user interacting with the form, third interaction data corresponding to the first user interacting with the form subsequent to the first interaction, etc. In some embodiments, the microapp recommendation engine 504 may perform the routine 800 after a threshold number of user interactions with the form have been recorded by the usage tracking engine 502.

At a step 804, the microapp recommendation engine 504 may determine, using the interaction data, the amount of time users spend interacting with the form. The microapp recommendation engine 504 may determine the amount of time each user spent interacting with the form, and/or may determine an average time the various users spent interacting with the form. At a step 806, the microapp recommendation engine 504 may determine the number of interface elements of the form the users interacted with. This determination may, for example, be made using the list(s) that were generated at the step 706 of the routine 700 by the usage tracking engine(s) 502.

At a step 808, the microapp recommendation engine 504 may determine variance data for each interface element in the list(s) that were generated at the step 706 of the routine 700 by the usage tracking engine(s) 502. The variance data may indicate a variance or a level of variation in input values provided by different users (or the same user during different interactions). The variance data may, for example, be determined using the hash values determined at the step 708 of the routine 700 by the usage tracking engine 502. Thus, the microapp recommendation engine 504 may use a hash value representation of the input value provided by a user instead of the actual input value, increasing processing efficiency and securing data provided by the user. The microapp recommendation engine 504 may, for example, determine first variance data using a first hash value corresponding to a first input value provided via a first interface element of the form and comparing it to a second hash value corresponding to a second input value provided via the first interface element. The microapp recommendation engine 504 may also determine second variance data using a third hash value corresponding to a third input value provided via a second interface element of the form and comparing it to a fourth hash value corresponding to a fourth input value provided via the second interface element. The variance data may be a numerical value indicating a number of variations in the input values provided for the interface element. A variance value that is "0" or close to "0" may indicate that multiple users provided the same or similar input values for the interface element. A variance value that is larger than "0" may indicate that the users provided different input values for the interface element.

When the microapp recommendation engine 504 determines (at decision step 810) that the variance data for a particular interface element exceeds a threshold value, the routine 800 may proceed to a step 812, where the interface element may be added to a recommendation list. At the decision step 810, the microapp recommendation engine 504 may, for example, determine if the variance data indicates a high enough variance in the input values for the interface element to warrant inclusion of the interface element in a microapp for the form. In other words, the variance data indicates that the users who interacted with the form provided different input values for the particular interface element, and thus including the particular interface element in the microapp may be beneficial.

At a step 814, the microapp recommendation engine 504 may determine a recommendation score for creating a microapp for the form. As described in connection with FIG. 4C, a microapp may correspond to a streamlined functionality of a form or an application, where the microapp can read and/or write data to a system of record using application programming interface (API) functions or the like, rather than by performing a full launch of the application for that system of record. In some cases, a microapp may include a subset of interface elements of the form or application to enable a user to quickly and efficiently complete a task in comparison to the full launch of the full application.

The microapp recommendation engine 504 may process various types of data, including interaction data collected with respect to a form of an application tracking multiple different users' interactions with the form, using one or more algorithms to determine the recommendation score for creating a microapp for the particular form of an application. In some embodiments, the microapp recommendation engine 504 may use one or more machine learning models to determine the recommendation score.

In some embodiments, the microapp recommendation engine 504 may determine the number of times (denoted as "N") the form being evaluated for a microapp recommendation was submitted. The number of times may be determined for a given time period. For example, "N" may represent the number of times the form was submitted within a given week or a given month. Multiple different users may interact with the form and submit the form, and in some cases the same user may interact with the form and submit it during the given time period. Each submission (even by the same user) may be considered as a respective interaction for determining the value of "N." The microapp recommendation engine 504 may use the number of times the form was submitted in determining the recommendation score for the form. In some embodiments, a (first) recommendation score corresponding to a (first) form that was submitted a (first) greater number of times may be higher than another (second) recommendation score corresponding to another (second) form that was submitted a (second) fewer number of times.

In some embodiments, the microapp recommendation engine 504 may additionally or alternatively determine the amount of time each user that submitted the form spent interacting with the form. To make this determination, the microapp recommendation engine 504 may use the interaction data, including the interaction times determined by the usage tracking engine 502, corresponding to respective users. The interaction time for a single interaction "i" may be denoted as "$t_i$." In some cases, the same user may have submitted the form over a given time period, and the microapp recommendation engine 504 may determine each submission to relate to a different interaction, identifying a first interaction time as "$t_1$," and a second interaction time as "$t_2$," for the same user. The microapp recommendation engine 504 may use the interaction time relating to each submission of the form in determining the recommendation score for the form. In some embodiments, a (first) recommendation score corresponding to a (first) form that users spent more time interacting with may be higher than another (second) recommendation score corresponding to another (second) form that users spent less time interacting with.

In some embodiments, the microapp recommendation engine 504 may additionally or alternatively determine the number of changed interface elements that have a variance level exceeding or meeting a threshold for the form. To make this determination, the microapp recommendation engine 504 may use the recommendation list (determined at the step 812) and determine the number of interface elements in the recommendation list. The microapp recommendation engine 504 may, for example, use the number of changed interface elements meeting/exceeding a variance level threshold in determining the recommendation score for the form. In some embodiments, a (first) recommendation score corresponding to a (first) form that has fewer such interface elements may be higher than another (second) recommendation score corresponding to another (second) form that has a greater number of changed interface elements meeting/exceeding the variance level threshold.

In an example implementation, the microapp recommendation engine 504 may use the below equation to determine the recommendation score for a given form:

$$\text{Recommendation score} = (t_1 + t_2 + \ldots + t_N)/f(x) \quad \text{Equation 1}$$

wherein $f(x) = b^{kx}$, where "b" is the base of the exponentiation, "x" represents the number of interface elements to be included in the microapp (derived from the recommendation list determined at the step 812), and "k" is a parameter which can be configured to control how fast and slow the exponential curve changes based on the number of interface elements "x." In Equation 1, "$t_i$" represents the interaction time associated with each form submission. Thus, using Equation 1, the recommendation score may be based on the interaction times and number of changed interface elements that meet/exceed a variance level threshold.

In another example implementation, the microapp recommendation engine 504 may use the below equation to determine the recommendation score for a given form:

$$\text{Recommendation score} = w_1(t_1 + t_2 + \ldots + t_N) / w_2 f(x) \quad \text{Equation 2}$$

where "$w_1$" and "$w_2$" are configurable weighing factors. An administrator user (who may, for example, be responsible for creating and managing microapps for an organization) may configure/adjust the weighing factors to apply a desired level of importance to the interaction time component and/or the interface element variance component of the recommendation score calculated according to Equation 2.

As illustrated by Equations 1 and 2, f(x) for forms with a large number of recommended interface elements for a microapp will be larger causing the recommendation score to be lower as compared to forms with a fewer number of recommended interface elements (where the f(x) will be comparatively lower). For example, given two forms that have similar interaction times (e.g., "$t_i$"), and the number of recommended interface elements for the microapp for the first form is lower than the number of recommended interface elements for the second form, the recommendation score for the first form will be higher than that of the second form.

In some embodiments, the microapp recommendation engine 504 may cause a client device 202 to display a microapp management dashboard. The client device 202, in this case, may, for example, be operated by an administrator user who is responsible for creating and managing microapps for an organization. The dashboard may show a list of applications and forms for which the system recommends creating a microapp. FIG. 9 shows a display screen 900 showing an example dashboard displaying information related to microapp recommendations. As shown in FIG. 9, the dashboard may display a ranked list of applications, and may also display the application, the form name, the recommendation score determined by the microapp recommendation engine 504, the number of users who interacted with the form for a given time period, the total time spent by all users who interacted with the form, the average amount of time a user spent interacting with the form, and the recommended interface elements/fields to include in the microapp. In some embodiments, the dashboard may also display additional information related to the microapp recommendation, information related to usage of the application and form that the system evaluated, and/or other information. For example, the dashboard may include information on which types of users interacted with the form, and may identify the users' roles/positions (e.g., manager, lead associate, junior analyst, etc.), the users' departments within the organization (e.g., accounting, marketing, human resources, etc.), office locations, or other types of associations with the organization.

In some embodiments, the dashboard may include a button or other interface element (e.g., microapp creation button), clicking or selection of which may enable the administrator user to initiate creation of a microapp. In some embodiments, each recommended application shown in the display screen 900 may be associated with its own microapp creation button, and clicking on a respective button may initiate creation of a microapp for that application. The system may, for example, create an initial version of a template for the microapp using the recommended interface elements determined by the microapp recommendation engine 504, and the administrator user may edit the template to desired specifications/configurations for the microapp.

In some embodiments, after a microapp has been created for an application/form, the microapp recommendation engine 504 may determine one or more return-on-investment (ROI) scores corresponding to the amount of time (or in some cases resources) users saved by using the microapp instead of a full launch of the application. The usage tracking engine 502 may determine an interaction time for the microapp, where the interaction time represents the amount of time a user spends interacting with the microapp. The usage tracking engine 502 may use the same or similar techniques (e.g., an interaction timer) described above in relation to the routine 600 of FIG. 6 to determine the interaction time for the microapp. The interaction time for the microapp may, for example, be associated with a microapp identifier and stored in the database 510. After a number of users interact with the microapp and interaction times for various interactions have been stored in the database 510, the microapp recommendation engine 504 may determine the ROI score(s) as follows. The microapp recommendation engine 504 may use the interaction times corresponding to multiple users/interactions determined by the usage tracking engine 502 (and stored in the database 510) for the form/application corresponding to the microapp.

In some implementations, an ROI score may represent the difference between the interaction time(s) corresponding to the form/application and the interaction time(s) corresponding to the microapp. In some embodiments, the microapp recommendation engine 504 may determine the ROI score as the difference in the average interaction time corresponding to the form/application and the average interaction time corresponding to the microapp (e.g., ROI score="3" minutes–"1" minute="2" minutes). In this case, the ROI score may represent an average savings in time per user when using the microapp instead of the full launch application.

In some implementations, the microapp recommendation engine 504 may additionally or alternatively determine an ROI score as the difference in the total interaction time (sum of the interaction times corresponding to multiple users/interactions) corresponding to the form/application and the total interaction time (sum of the interaction times corresponding to multiple users/interactions) corresponding to the microapp (e.g., ROI score="600" minutes–"200" minutes="400" minutes). In this case, the ROI score may represent the total savings in time realized by an organization when its users use the microapp instead of the full launch application.

In some implementations, the microapp recommendation engine 504 may additionally or alternatively use a different algorithm(s) or a mathematical operation other than subtraction to determine an ROI score. For example, an ROI score may be a percentage between the interaction time (average or total) for the microapp and the interaction time (average or total) for the form/application (e.g., ROI score="200" minutes/"600" minutes="0.33"="33%"). In this case, the ROI score may represent the percent of time saved when users user the microapp instead of the full launch application. In other implementations, the microapp recommendation engine 504 may use other data instead of or in addition to interaction time to determine an ROI score (e.g., the other data may include feedback from users, the number of users using the microapp for a given time period, the number of users that continue to use the full launch application instead of the microapp, the number of interface elements interacted with via the microapp, etc.).

In some embodiments, one or more ROI scores may be displayed in (another screen of) the dashboard shown in FIG. 9, so that the administrator user is able to see the time savings realized by implementing the microapp for a particular application.

In this manner, the system described herein may track multiple users' interactions with a form, including the time spent by the users and the interface elements changed by the users. Using data representing the user interactions (e.g., interaction time, variance data associated with the interface elements, number of users, etc.), the system may recommend whether a form is a good candidate for a microapp, and may also recommend which interface elements should be included in the microapp. The system, thus, may enable administrator users to efficiently identify the forms/applications for which to create microapps.

F. Example Implementations of Methods, Systems, and Computer-Readable Media in Accordance with the Present Disclosure The following paragraphs (M1) through (M20) describe examples of methods that may be implemented in accordance with the present disclosure.

(M1) A method may involve a client device evaluating data received from a website to identify a first form, identifying at least first and second input elements on the first form, the first input element corresponding to a first field that can be varied by a user of the client device and the second input element corresponding to an instruction to submit the first form to the website, and enabling at least first and second event handlers corresponding to the first and second input elements, respectively, the first event handler configured to detect whether the first field changes and the second event handler configured to detect selection of the second input element. The method may further involve the second event handler detecting selection of the second input element, and the client device, in response to detecting selection of the second input element, determining, based on at least one change detected by the first event handler, that the first field was changed by the user, and storing first data indicating that the first field in a submitted version of the first form was changed by the user.

(M2) A method may be performed as described in paragraph (M1), wherein a portion of the first data corresponds to a value of the first field in the submitted version of the first form.

(M3) A method may be performed as described in paragraph (M1) or paragraph (M2), wherein the portion of the first data comprises a hash value representation corresponding to the value.

(M4) A method may be performed as described in any of paragraphs (M1) through (M3), and may further involve the client device enabling a timer configured to detect an amount of time spent by the user interacting with the first input element.

(M5) A method may be performed as described in any of paragraphs (M1) through (M4), and may further involve the client device enabling a timer configured to detect an amount of time spent by the user interacting with the first form, in response to detecting selection of the second input element, disabling the timer, and storing the first data including the amount of time.

(M6) A method may be performed as described in any of paragraphs (M1) through (M5), and may further involve the client device enabling a third event handler corresponding to a third input element on the first form, the third event handler configured to detect whether the third input element changes, and storing second data indicating that the third input element in the submitted version of the first form was changed by the user.

(M7) A method may involve receiving first data representing a first interaction by a first user with a first form of an application, identifying a first hash value representation of a first input value entered by the first user for a first input element of the first form, receiving second data representing a second interaction by a second user with the first form, and identifying a second hash value representation of a second input value entered by the second user for the first input element. The method may further involve determining variance data using differences in at least the first hash value representation and the second hash value representation, determining, using at least the variance data, a first recommendation for creating a streamlined functionality corresponding to a functionality of the first form, and sending, to a computing device, the first recommendation, a first indication of the first form, and a second indication of the first input element.

(M8) A method may be performed as described in paragraph (M7), and may further involve determining that the variance data meets a threshold value, and sending the second indication of the first input element based on the variance data meeting the threshold value.

(M9) A method may be performed as described in paragraph (M7) or paragraph (M8), and may further involve identifying, using the first data, a first interaction time representing an amount of time spent by the first user interacting with the first form, identifying, using the second data, a second interaction time representing an amount of time spent by the second user interacting with the first form, and determining the first recommendation using the first interaction time and the second interaction time.

(M10) A method may be performed as described in any of paragraphs (M7) through (M9), and may further involve determining, using the first data, a first number of interface elements of the form that the first user interacts with, determining, using the second data, a second number of interface elements of the form that the second user interacts with, and determining the first recommendation using the first number and the second number.

(M11) A method may be performed as described in any of paragraphs (M7) through (M10), and may further involve receiving third data representing a third interaction by a third user with a second form of an additional application, receiving fourth data representing a fourth interaction by a fourth user with the second form, determining, using at least the third data and the fourth data, a second recommendation for creating a streamlined functionality corresponding to a functionality of the second form, determining a ranked list of forms based on the first recommendation score and the second recommendation, and sending, to a computing device, the ranked list for output.

(M12) A method may be performed as described in any of paragraphs (M7) through (M11), and may further involve identifying, using the first data, a third hash value representation of a third input value entered by the first user for a second input element of the first form, identifying, using the second data, a fourth hash value representation of a fourth input value entered by the second user for the second input element, determining additional variance data using differences in at least the third hash value representation and the fourth hash value representation, and determining the first recommendation using at least the additional variance data.

(M13) A method may be performed as described in any of paragraphs (M7) through (M12), and may further involve identifying a number of users, including the first user and the second user, that interact with the first form, and determining the recommendation using the number of users.

(M14) A method may involve a first computing device detecting interaction with a first form, identifying at least first and second input elements on the first form, the first input element corresponding to a first field that can be varied by a user of the first computing device and the second input element corresponding to an instruction to submit the first form, and enabling at least first and second event handlers corresponding to the first and second input elements, respectively, the first event handler configured to detect whether the first field changes and the second event handler configured to detect selection of the second input element. The method may further involve the first computing device detecting, by the second event handler, selection of the second input element, in response to detecting selection of the second input element, determining, based on at least one change detected by the first event handler, that the first field was changed by the user, and storing first data indicating at least that the first field in a submitted version of the first form was changed by the user. The method may further involve a computing system receiving the first data representing a first interaction by the user with the first form, identifying a first hash value representation of a first input value entered by the user for the first field, receiving second data representing a second interaction by an additional user with the first form, and identifying a second hash value representation of a second input value entered by the additional user for the first field. The method may further involve the computing system determining variance data using differences in at least the first hash value representation and the second hash value representation, and determining, using at least the variance data, a recommendation for creating a streamlined functionality corresponding to a functionality of the first form.

(M15) A method may be performed as described in paragraph (M14), and may further involve the computing system determining that the variance data meets a threshold value, and sending, to a second computing device, the recommendation, a first indication of the first form and a second indication of the first field.

(M16) A method may be performed as described in paragraph (M14) or paragraph (M15), and may further involve the first computing device enabling a timer configured to detect an amount of time spent by the user interacting with the first form, and wherein the first data includes the amount of time.

(M17) A method may be performed as described in any of paragraphs (M14) through (M16), and may further involve the computing system identifying, using the first data, a first interaction time representing an amount of time spent by the user interacting with the first form, identifying, using the second data, a second interaction time representing an amount of time spent by the additional user interacting with the first form, and determining the recommendation using the first interaction time and the second interaction time.

(M18) A method may be performed as described in any of paragraphs (M14) through (M17), and may further involve a second computing device detecting interaction with the first form, and enabling at least third and fourth event handlers corresponding to the first and second input elements, respectively, the third event handler configured to detect whether the first input field changes and the fourth event handler configured to detect selection of the second input element. The method may further involve the second computing device detecting, by the fourth event handler, selection of the second input element, in response to detecting selection of the second input element, determining, based on at least one change detected by the third event handler, that the first field was changed by the additional user, and storing the second data indicating at least that the first field in a submitted version of the first form was changed by the additional user.

(M19) A method may be performed as described in any of paragraphs (M14) through (M18), and may further involve the computing system identifying a number of users that interact with the first form, and determining the recommendation using the number of users.

(M20) A method may be performed as described in any of paragraphs (M14) through (M19), and may further involve the computing system receiving third data representing a third interaction by a third user with a second form, receiving fourth data representing a fourth interaction by a fourth user with the second form, determining, using at least the third data and the fourth data, an additional recommendation for creating a streamlined functionality corresponding to a functionality of the second form, determining a ranked list of forms based on the recommendation score and the additional recommendation, and sending, to a second computing device, the ranked list for output.

The following paragraphs (S1) through (S20) describe examples of systems and devices that may be implemented in accordance with the present disclosure.

(S1) A system may comprise a first computing device including at least a first processor and at least a first computer-readable medium encoded with first instructions which, when executed by the at least first processor, cause the first computing device to detect interaction with a first form, identify at least first and second input elements on the first form, the first input element corresponding to a first field that can be varied by a user of the first computing device and the second input element corresponding to an instruction to submit the first form, and enable at least first and second event handlers corresponding to the first and second input elements, respectively, the first event handler configured to detect whether the first field changes and the second event handler configured to detect selection of the second input element. The first instructions further cause the first computing device to detect, by the second event handler, selection of the second input element, in response to detecting selection of the second input element, determine, based on at least one change detected by the first event handler, that the first field was changed by the user, and store first data indicating at least that the first field in a submitted version of the first form was changed by the user. The system may further comprise a computing system including at least a second processor and at least a second computer-readable medium encoded with second instructions which, when executed by the at least second processor, cause the computing system to receive the first data representing a first interaction by the user with the first form, identify a first hash value representation of a first input value entered by the user for the first field, receive second data representing a second interaction by an additional user with the first form, and identify a second hash value representation of a second input value entered by the additional user for the first field. The second instructions may further cause the computing system to determine variance data using differences in at least the first hash value representation and the second hash value representation, and determine, using at least the variance data, a recommendation for creating a streamlined functionality corresponding to a functionality of the first form.

(S2) A system may be configured as described in paragraph (S1), wherein the second instructions which, when executed by the at least second processor, may further cause the computing system to determine that the variance data meets a threshold value, and send, to a second computing device, the recommendation, a first indication of the first form and a second indication of the first field.

(S3) A system may be configured as described in paragraph (S1) or paragraph (S2), wherein the first instructions which, when executed by the at least first processor, may further cause the first computing device to enable a timer configured to detect an amount of time spent by the user interacting with the first form, and wherein the first data includes the amount of time.

(S4) A system may be configured as described in any of paragraphs (S1) through (S3), wherein the second instructions which, when executed by the at least second processor, may further cause the computing system to identify, using the first data, a first interaction time representing an amount of time spent by the user interacting with the first form, identify, using the second data, a second interaction time representing an amount of time spent by the additional user interacting with the first form, and determine the recommendation using the first interaction time and the second interaction time.

(S5) A system may be configured as described in any of paragraphs (S1) through (S4), and may further comprise a second computing device including at least a third processor and at least a third computer-readable medium encoded with third instructions which, when executed by the at least third processor, cause the second computing device to detect interaction with the first form, enable at least third and fourth event handlers corresponding to the first and second input elements, respectively, the third event handler configured to detect whether the first input field changes and the fourth event handler configured to detect selection of the second input element, and detect, by the fourth event handler, selection of the second input element. The third instructions may further cause the second computing device to, in response to detecting selection of the second input element, determine, based on at least one change detected by the third event handler, that the first field was changed by the additional user, and store the second data indicating at least that the first field in a submitted version of the first form was changed by the additional user.

(S6) A system may be configured as described in any of paragraphs (S1) through (S5), wherein the second instructions which, when executed by the at least second processor, may further cause the computing system to identify a number of users that interact with the first form, and determine the recommendation using the number of users.

(S7) A system may be configured as described in any of paragraphs (S1) through (S6), wherein the second instructions which, when executed by the at least second processor, may further cause the computing system to receive third data representing a third interaction by a third user with a second form, receive fourth data representing a fourth interaction by a fourth user with the second form, determine, using at least the third data and the fourth data, an additional recommendation for creating a streamlined functionality corresponding to a functionality of the second form, determine a ranked list of forms based on the recommendation score and the additional recommendation, and send, to a second computing device, the ranked list for output.

(S8) A system may comprise at least one processor, and at least one computer-readable medium encoded with instructions which, when executed by the at least one processor, cause the system to evaluate data received from a website to identify a first form, identify at least first and second input elements on the first form, the first input element corresponding to a first field that can be varied by a user of the client device and the second input element corresponding to an instruction to submit the first form to the website, and enable at least first and second event handlers corresponding to the first and second input elements, respectively, the first event handler configured to detect whether the first field changes and the second event handler configured to detect selection of the second input element. The instructions may further cause the system to detect, by the second event handler, selection of the second input element, in response to detecting selection of the second input element, determine, based on at least one change detected by the first event handler, that the first field was changed by the user, and store first data indicating that the first field in a submitted version of the first form was changed by the user.

(S9) A system may be configured as described in paragraph (S8), wherein a portion of the first data corresponds to a value of the first field in the submitted version of the first form.

(S10) A system may be configured as described in paragraph (S7) or paragraph (S9), wherein the portion of the first data comprises a hash value representation corresponding to the value.

(S11) A system may be configured as described in any of paragraphs (S7) through (S10), wherein the at least one computer-readable medium may be encoded with additional instructions which, when executed by the at least one processor, may further cause the system to enable a timer configured to detect an amount of time spent by the user interacting with the first input element.

(S12) A system may be configured as described in any of paragraphs (S7) through (S11), wherein the at least one computer-readable medium may be encoded with additional instructions which, when executed by the at least one processor, may further cause the system to enable a timer configured to detect an amount of time spent by the user interacting with the first form, in response to detecting selection of the second input element, disable the timer, and store the first data including the amount of time.

(S13) A system may be configured as described in any of paragraphs (S7) through (S12), wherein the at least one computer-readable medium may be encoded with additional instructions which, when executed by the at least one processor, may further cause the system to enable a third event handler corresponding to a third input element on the first form, the third event handler configured to detect whether the third input element changes, and store second data indicating that the third input element in the submitted version of the first form was changed by the user.

(S14) A system may comprise at least one processor, and at least one computer-readable medium encoded with instructions which, when executed by the at least one processor, cause the system to receive first data representing a first interaction by a first user with a first form of an application, identify a first hash value representation of a first input value entered by the first user for a first input element of the first form, receive second data representing a second interaction by a second user with the first form, and identify a second hash value representation of a second input value entered by the second user for the first input element. The instructions may further cause the system to determine variance data using differences in at least the first hash value representation and the second hash value representation, determine, using at least the variance data, a first recommendation for creating a streamlined functionality corresponding to a functionality of the first form, and send, to a computing device, the first recommendation, a first indication of the first form, and a second indication of the first input element.

(S15) A system may be configured as described in paragraph (S14), wherein the at least one computer-readable medium may be encoded with additional instructions which, when executed by the at least one processor, may further cause the system to determine that the variance data meets a threshold value, and send the second indication of the first input element based on the variance data meeting the threshold value.

(S16) A system may be configured as described in paragraph (S14) or paragraph (S15), wherein the at least one computer-readable medium may be encoded with additional instructions which, when executed by the at least one processor, may further cause the system to identify, using the first data, a first interaction time representing an amount of time spent by the first user interacting with the first form, identify, using the second data, a second interaction time representing an amount of time spent by the second user interacting with the first form, and determine the first recommendation using the first interaction time and the second interaction time.

(S17) A system may be configured as described in any of paragraphs (S14) through (S16), wherein the at least one computer-readable medium may be encoded with additional instructions which, when executed by the at least one processor, may further cause the system to determine, using the first data, a first number of interface elements of the form that the first user interacts with, determine, using the second data, a second number of interface elements of the form that the second user interacts with, and determine the first recommendation using the first number and the second number.

(S18) A system may be configured as described in any of paragraphs (S14) through (S17), wherein the at least one computer-readable medium may be encoded with additional instructions which, when executed by the at least one processor, may further cause the system to receive third data representing a third interaction by a third user with a second form of an additional application, receive fourth data representing a fourth interaction by a fourth user with the second form, determine, using at least the third data and the fourth data, a second recommendation for creating a streamlined functionality corresponding to a functionality of the second form, determine a ranked list of forms based on the first recommendation score and the second recommendation, and send, to a computing device, the ranked list for output.

(S19) A system may be configured as described in any of paragraphs (S14) through (S18), wherein the at least one computer-readable medium may be encoded with additional instructions which, when executed by the at least one processor, may further cause the system to identify, using the first data, a third hash value representation of a third input value entered by the first user for a second input element of the first form, identify, using the second data, a fourth hash value representation of a fourth input value entered by the second user for the second input element, determine additional variance data using differences in at least the third hash value representation and the fourth hash value representation, and determine the first recommendation using at least the additional variance data.

(S20) A system may be configured as described in any of paragraphs (S14) through (S19), wherein the at least one computer-readable medium may be encoded with additional instructions which, when executed by the at least one processor, may further cause the system to identify a number of users, including the first user and the second user, that interact with the first form, and determine the recommendation using the number of users.

The following paragraphs (CRM1) through (CRM20) describe examples of computer-readable media that may be configured in accordance with the present disclosure.

(CRM1) At least one non-transitory, computer-readable medium may be encoded with instructions which, when executed by at least one processor included in a system, cause the system to evaluate data received from a website to identify a first form, identify at least first and second input elements on the first form, the first input element corresponding to a first field that can be varied by a user of the client device and the second input element corresponding to an instruction to submit the first form to the website, and enable at least first and second event handlers corresponding to the first and second input elements, respectively, the first event handler configured to detect whether the first field changes and the second event handler configured to detect selection of the second input element. The instructions may further cause the system to detect, by the second event handler, selection of the second input element, in response to detecting selection of the second input element, determine, based on at least one change detected by the first event handler, that the first field was changed by the user, and store first data indicating that the first field in a submitted version of the first form was changed by the user.

(CRM2) At least one computer-readable medium may be configured as described in paragraph (CRM1), wherein a portion of the first data corresponds to a value of the first field in the submitted version of the first form.

(CRM3) At least one computer-readable medium may be configured as described in paragraph (CRM1) or paragraph (CRM2), wherein the portion of the first data comprises a hash value representation corresponding to the value.

(CRM4) At least one computer-readable medium may be configured as described in any of paragraphs (CRM1) through (CRM3), and may further be encoded with additional instructions which, when executed by the at least one processor, may further cause the system to enable a timer configured to detect an amount of time spent by the user interacting with the first input element.

(CRM5) At least one computer-readable medium may be configured as described in any of paragraphs (CRM1) through (CRM4), and may further be encoded with additional instructions which, when executed by the at least one processor, may further cause the system to enable a timer configured to detect an amount of time spent by the user interacting with the first form, in response to detecting selection of the second input element, disable the timer, and store the first data including the amount of time.

(CRM6) At least one computer-readable medium may be configured as described in any of paragraphs (CRM1) through (CRM5), and may further be encoded with additional instructions which, when executed by the at least one processor, may further cause the system to enable a third event handler corresponding to a third input element on the first form, the third event handler configured to detect whether the third input element changes, and store second data indicating that the third input element in the submitted version of the first form was changed by the user.

(CRM7) At least one non-transitory, computer-readable medium may be encoded with instructions which, when executed by at least one processor included in a system, cause the system to receive first data representing a first interaction by a first user with a first form of an application, identify a first hash value representation of a first input value entered by the first user for a first input element of the first form, receive second data representing a second interaction by a second user with the first form, and identify a second hash value representation of a second input value entered by the second user for the first input element. The instructions may further cause the system to determine variance data using differences in at least the first hash value representation and the second hash value representation, determine, using at least the variance data, a first recommendation for creating a streamlined functionality corresponding to a functionality of the first form, and send, to a computing device, the first recommendation, a first indication of the first form, and a second indication of the first input element.

(CRM8) At least one computer-readable medium may be configured as described in paragraph (CRM7), and may further be encoded with additional instructions which, when executed by the at least one processor, may further cause the system to determine that the variance data meets a threshold value, and send the second indication of the first input element based on the variance data meeting the threshold value.

(CRM9) At least one computer-readable medium may be configured as described in paragraph (CRM7) or paragraph (CRM8), and may further be encoded with additional instructions which, when executed by the at least one processor, may further cause the system to identify, using the first data, a first interaction time representing an amount of time spent by the first user interacting with the first form, identify, using the second data, a second interaction time representing an amount of time spent by the second user interacting with the first form, and determine the first recommendation using the first interaction time and the second interaction time.

(CRM10) At least one computer-readable medium may be configured as described in any of paragraphs (CRM7) through (CRM9), and may further be encoded with additional instructions which, when executed by the at least one processor, may further cause the system to determine, using the first data, a first number of interface elements of the form that the first user interacts with, determine, using the second data, a second number of interface elements of the form that the second user interacts with, and determine the first recommendation using the first number and the second number.

(CRM11) At least one computer-readable medium may be configured as described in any of paragraphs (CRM7) through (CRM10), and may further be encoded with additional instructions which, when executed by the at least one processor, may further cause the system to receive third data representing a third interaction by a third user with a second form of an additional application, receive fourth data representing a fourth interaction by a fourth user with the second form, determine, using at least the third data and the fourth data, a second recommendation for creating a streamlined functionality corresponding to a functionality of the second form, determine a ranked list of forms based on the first recommendation score and the second recommendation, and send, to a computing device, the ranked list for output.

(CRM12) At least one computer-readable medium may be configured as described in any of paragraphs (CRM7) through (CRM11), and may further be encoded with additional instructions which, when executed by the at least one processor, may further cause the system to identify, using the first data, a third hash value representation of a third input value entered by the first user for a second input element of the first form, identify, using the second data, a fourth hash value representation of a fourth input value entered by the second user for the second input element, determine additional variance data using differences in at least the third hash value representation and the fourth hash value representation, and determine the first recommendation using at least the additional variance data.

(CRM13) At least one computer-readable medium may be configured as described in any of paragraphs (CRM7) through (CRM12), and may further be encoded with additional instructions which, when executed by the at least one processor, may further cause the system to identify a number of users, including the first user and the second user, that interact with the first form, and determine the recommendation using the number of users.

(CRM14) At least a first non-transitory, computer-readable medium may be encoded with first instructions which, when executed by at least a first processor included in a first system, cause the first system to detect interaction with a first form, identify at least first and second input elements on the first form, the first input element corresponding to a first field that can be varied by a user of the first computing device and the second input element corresponding to an instruction to submit the first form, and enable at least first and second event handlers corresponding to the first and second input elements, respectively, the first event handler configured to detect whether the first field changes and the second event handler configured to detect selection of the second input element. The first instructions further cause the first system to detect, by the second event handler, selection of the second input element, in response to detecting selection of the second input element, determine, based on at least one change detected by the first event handler, that the first field was changed by the user, and store first data indicating at least that the first field in a submitted version of the first form was changed by the user. At least a second non-transitory, computer-readable medium may be encoded with second instructions which, when executed by at least a second processor included in a second system, cause the second system to receive the first data representing a first interaction by the user with the first form, identify a first hash value representation of a first input value entered by the user for the first field, receive second data representing a second interaction by an additional user with the first form, and identify a second hash value representation of a second input value entered by the additional user for the first field. The second instructions may further cause the second system to determine variance data using differences in at least the first hash value representation and the second hash value representation, and determine, using at least the variance data, a recommendation for creating a streamlined functionality corresponding to a functionality of the first form.

(CRM15) At least a first and second computer-readable medium may be configured as described in paragraph (CRM14), and may further be encoded with additional instructions which, when executed by the at least second processor, may further cause the second system to determine that the variance data meets a threshold value, and send, to a second computing device, the recommendation, a first indication of the first form and a second indication of the first field.

(CRM16) At least a first and second computer-readable medium may be configured as described in paragraph (CRM14) or paragraph (CRM15), and may further be encoded with additional instructions which, when executed by the at least first processor, may further cause the first system to enable a timer configured to detect an amount of time spent by the user interacting with the first form, and wherein the first data includes the amount of time.

(CRM17) At least a first and second computer-readable medium may be configured as described in any of paragraphs (CRM14) through (CRM16), and may further be encoded with additional instructions which, when executed by the at least second processor, may further cause the second system to identify, using the first data, a first interaction time representing an amount of time spent by the user interacting with the first form, identify, using the second data, a second interaction time representing an amount of time spent by the additional user interacting with the first form, and determine the recommendation using the first interaction time and the second interaction time.

(CRM18) At least a first and second computer-readable medium may be configured as described in any of paragraphs (CRM14) through (CRM17), and may further include at least a third non-transitory, computer-readable medium that may be encoded with third instructions which, when executed by at least a third processor included in a third system, cause the third system to detect interaction with the first form, enable at least third and fourth event handlers corresponding to the first and second input elements, respectively, the third event handler configured to detect whether the first input field changes and the fourth event handler configured to detect selection of the second input element, and detect, by the fourth event handler, selection of the second input element. The third instructions may further cause the second computing device to, in response to detecting selection of the second input element, determine, based on at least one change detected by the third event handler, that the first field was changed by the additional user, and store the second data indicating at least that the first field in a submitted version of the first form was changed by the additional user.

(CRM19) At least a first and second computer-readable medium may be configured as described in any of paragraphs (CRM14) through (CRM18), and may further be encoded with additional instructions which, when executed by the at least second processor, may further cause the second system to identify a number of users that interact with the first form, and determine the recommendation using the number of users.

(CRM20) At least a first and second computer-readable medium may be configured as described in any of paragraphs (CRM14) through (CRM19), and may further be encoded with additional instructions which, when executed by the at least second processor, may further cause the second system to receive third data representing a third interaction by a third user with a second form, receive fourth data representing a fourth interaction by a fourth user with the second form, determine, using at least the third data and the fourth data, an additional recommendation for creating a streamlined functionality corresponding to a functionality of the second form, determine a ranked list of forms based on the recommendation score and the additional recommendation, and send, to a second computing device, the ranked list for output.

Having thus described several aspects of at least one embodiment, it is to be appreciated that various alterations, modifications, and improvements will readily occur to those skilled in the art. Such alterations, modifications, and improvements are intended to be part of this disclosure, and are intended to be within the spirit and scope of the disclosure. Accordingly, the foregoing description and drawings are by way of example only.

Various aspects of the present disclosure may be used alone, in combination, or in a variety of arrangements not specifically discussed in the embodiments described in the foregoing and is therefore not limited in this application to the details and arrangement of components set forth in the foregoing description or illustrated in the drawings. For example, aspects described in one embodiment may be combined in any manner with aspects described in other embodiments.

Also, the disclosed aspects may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc. in the claims to modify a claim element does not by itself connote any priority, precedence or order of one claim element over another or the temporal order in which acts of a method are performed, but are used merely as labels to distinguish one claimed element having a certain name from another element having a same name (but for use of the ordinal term) to distinguish the claim elements.

Also, the phraseology and terminology used herein is used for the purpose of description and should not be regarded as limiting. The use of "including," "comprising," or "having," "containing," "involving," and variations thereof herein, is meant to encompass the items listed thereafter and equivalents thereof as well as additional items.

What is claimed is:
1. A method, comprising:
accessing a first form that includes (a) a first element that is configured to receive input and that is associated with a first event handler configured to detect the received input, and (b) a second element that corresponds to an instruction to submit the first form and that is associated with a second event handler configured to detect selection of the second element;
in response to accessing the first form, providing a first rendering of the first form and activating the first and second event handlers;
detecting selection of the second element by the second event handler;
in response to the detecting selection of the second element, determining, based on the received input detected by the first event handler, a first value associated with the first element;
storing first data representing the first value;
generating, using a hash function, a first hash value representation of the first value;
providing a second rendering of the first form;
receiving second data representing a second value associated with the first element, wherein the second value is provided via the second rendering of the first form;
generating, using the hash function, a second hash value representation of the second value;
determining first variance data for the first element using differences between at least the first hash value representation and the second hash value representation;
determining a first recommendation score for creating a first streamlined functionality corresponding to the first form, wherein the first recommendation score depends on (a) an interaction time associated with the first rendering, (b) an interaction time associated with the second rendering, and (c) a quantity of elements on the first form having variance data exceeding a threshold;

generating a ranked list of a plurality of streamlined functionalities, one of which is the first streamlined functionality; and sending, to a computing device, the ranked list of the plurality of streamlined functionalities, the ranked list including, for the first streamlined functionality, an identifier of the elements on the first form having variance data exceeding the threshold, and the first recommendation score.

2. The method of claim 1, wherein the first variance data meets the threshold.

3. The method of claim 1, wherein:
the interaction time associated with the first rendering occurs at a first computing device; and
the interaction time associated with the second rendering occurs at a second computing device.

4. The method of claim 1, further comprising:
determining a first number of elements of the first form that are interacted with via the provided first rendering;
determining a second number of elements of the first form that are interacted with via the provided second rendering; and
determining the first recommendation score using the first number and the second number.

5. The method of claim 1, further comprising:
receiving third data representing a first interaction by a first user with a second form;
receiving fourth data representing a second interaction by a second user with the second form;
determining, using at least the third data and the fourth data, a second recommendation score for creating a second streamlined functionality corresponding to a functionality of the second form; and
including the second streamlined functionality in the ranked list.

6. The method of claim 1, further comprising:
generating, using the hash function, a third hash value representation of a third value entered for a second element of the first form;
generating, using the hash function, a fourth hash value representation of a fourth value entered for the second element;
determining second variance data using differences in at least the third hash value representation and the fourth hash value representation; and
determining the first recommendation score using at least the second variance data.

7. The method of claim 1, further comprising:
identifying a number of users that interact with the first form; and
determining the first recommendation score using the number of users.

8. The method of claim 1, wherein an identifier of the first form is used as a key to generate at least one of the first or second hash value representations.

9. A system comprising:
a first client computing device including a first client memory and at least one first client processor coupled to the first client memory and configured to:
access a first form at the first client computing device, wherein the first form includes (a) a first element that is configured to receive input and that is associated with a first event handler configured to detect the received input, and (b) a second element that corresponds to an instruction to submit the first form and that is associated with a second event handler configured to detect selection of the second element;
in response to accessing the first form, use the at least one first client processor to (a) provide a first rendering of the first form at the first client computing device and (b) activate the first and second event handlers;
detect, by the second event handler, selection of the second element;
in response to the detecting selection of the second element, determine, based on the received input detected by the first event handler, a first value associated with the first element; and
store first data representing the first value; and
a first server computing device including a first server memory and at least one first server processor coupled to the first server memory and configured to:
receive, from the first client computing device, the first data representing the first value;
generate, using a hash function, a first hash value representation of the first value;
receive, from a second client computing device, second data representing a second value associated with the first element of the first form, wherein the second value is provided via a second rendering of the first form at the second client computing device;
generate, using the hash function, a second hash value representation of the second value;
determine first variance data for the first element using differences between at least the first hash value representation and the second hash value representation;
determine a first recommendation score for creating a first streamlined functionality corresponding to the first form, wherein the first recommendation score depends on (a) an interaction time associated with the first form observed at the first client computing device, (b) an interaction time associated with the first form observed at the second client computing device, and (c) a quantity of elements on the first form having variance data exceeding a threshold;
generate a ranked list of a plurality of streamlined functionalities, one of which is the first streamlined functionality; and
send, to a second server computing device, the ranked list of the plurality of streamlined functionalities, the ranked list including, for the first streamlined functionality, an identifier of the first form, an identifier of the elements on the first form having variance data exceeding the threshold, and the first recommendation score.

10. The system of claim 9, wherein the first variance data meets the threshold.

11. The system of claim 9, wherein:
the interaction time observed at the first client computing device represents an amount of time spent by a first user interacting with the first rendering; and
the interaction time observed at the second client computing device represents an amount of time spent by a second user interacting with the second rendering.

12. The system of claim 9, wherein the at least one first server processor is further configured to:
determine a first number of elements of the first form that are interacted with via the provided first rendering;
determine a second number of elements of the first form that are interacted with via the provided second rendering; and
determine the first recommendation score using the first number and the second number.

13. The system of claim 9, wherein the at least one first server processor is further configured to:
receive third data representing a first interaction by a first user with a second form;
receive fourth data representing a second interaction by a second user with the second form;
determine, using at least the third data and the fourth data, a second recommendation score for creating a second streamlined functionality corresponding to a functionality of the second form; and
include the second streamlined functionality in the ranked list.

14. The system of claim 9, wherein the at least one first server processor is further configured to:
generate, using the hash function, a third hash value representation of a third value entered for a second element of the first form;
generate, using the hash function, a fourth hash value representation of a fourth value entered for the second element;
determine second variance data using differences in at least the third hash value representation and the fourth hash value representation; and
determine the first recommendation score using at least the second variance data.

15. The system of claim 9, wherein the at least one first server processor is further configured to:
identify a number of users that interact with the first form; and
determine the first recommendation score using the number of users.

16. The system of claim 9, wherein identifying the first hash value representation comprises generating the first hash value representation using an identifier of the first form as a key.

17. A non-transitory computer readable medium storing executable sequences of instructions, the sequences of instructions comprising instructions that, when executed by a processor, cause the processor to:
access a first form that includes (a) a first element that is configured to receive input and that is associated with a first event handler configured to detect the received input, and (b) a second element that corresponds to an instruction to submit the first form and that is associated with a second event handler configured to detect selection of the second element;
in response to accessing the first form, provide a first rendering of the first form and activate the first and second event handlers;
detect selection of the second element by the second event handler;
in response to the detecting selection of the second element, determine, based on the received input detected by the first event handler, a first value associated with the first element;
store first data representing the first value;
generate, using a hash function, a first hash value representation of the first value;
provide a second rendering of the first form;
receive second data representing a second value associated with the first element, wherein the second value is provided via the second rendering of the first form;
generate, using the hash function, a second hash value representation of the second value;
determine first variance data for the first element using differences between at least the first hash value representation and the second hash value representation;
determine a first recommendation score for creating a first streamlined functionality corresponding to the first form, wherein the first recommendation score depends on (a) an interaction time associated with the first rendering, (b) an interaction time associated with the second rendering, and (c) a quantity of elements on the first form having variance data exceeding a threshold;
generate a ranked list of a plurality of streamlined functionalities, one of which is the first streamlined functionality; and
send, to a computing device, the ranked list of the plurality of streamlined functionalities, the ranked list including, for the first streamlined functionality, an identifier of the elements on the first form having variance data exceeding the threshold, and the first recommendation score.

18. The computer readable medium of claim 17, wherein the first hash value representation is generated using an identifier of the first form as a key.

19. The computer readable medium of claim 17, wherein the first variance data meets the threshold.

20. The computer readable medium of claim 17, wherein the sequences of instructions further include instructions that, when executed by the processor, cause the processor to: identify a number of users that interact with the first form, wherein the first recommendation score depends on the number of users.

* * * * *